US012563559B2

(12) United States Patent
Teyeb et al.

(10) Patent No.: US 12,563,559 B2
(45) Date of Patent: **\*Feb. 24, 2026**

(54) PROVIDING MEASUREMENT CAPABILITIES TO A NETWORK NODE

(71) Applicant: Telefonaktiebolaget LM Ericsson (publ), Stockholm (SE)

(72) Inventors: Oumer Teyeb, Montréal (CA); Patrik Rugeland, Stockholm (SE)

(73) Assignee: TELEFONAKTIEBOLAGET LM ERICSSON (PUBL), Stockholm (SE)

( \* ) Notice: Subject to any disclaimer, the term of this patent is extended or adjusted under 35 U.S.C. 154(b) by 2 days.

This patent is subject to a terminal disclaimer.

(21) Appl. No.: 18/635,865

(22) Filed: Apr. 15, 2024

(65) Prior Publication Data

US 2024/0260044 A1 Aug. 1, 2024

Related U.S. Application Data

(63) Continuation of application No. 17/608,217, filed as application No. PCT/IB2020/054154 on May 1, 2020, now Pat. No. 11,991,703.

(Continued)

(51) Int. Cl.
*H04W 72/21* (2023.01)
*H04W 72/12* (2023.01)
(Continued)

(52) U.S. Cl.
CPC ....... *H04W 72/21* (2023.01); *H04W 72/1215* (2013.01); *H04W 72/23* (2023.01);
(Continued)

(58) Field of Classification Search
CPC . H04W 72/21; H04W 72/1215; H04W 72/23; H04W 76/27; H04W 76/30;
(Continued)

(56) References Cited

U.S. PATENT DOCUMENTS 9,462,562 B2 10/2016 Chakraborty
2012/0295623 A1\* 11/2012 Siomina ................ G01S 5/0263
455/456.2
(Continued)

FOREIGN PATENT DOCUMENTS

WO 2018/144781 A1 8/2018

OTHER PUBLICATIONS

International Search Report and Written Opinion dated Aug. 4, 2020 in International Application No. PCT/IB2020/054154 (10 pages total).
(Continued)

*Primary Examiner* — Will W Lin
(74) *Attorney, Agent, or Firm* — Rothwell, Figg, Ernst & Manbeck, P.C.

(57) ABSTRACT

UE capability information for both LTE and NR is provided so that the network will be able to determine: 1) whether the UE supports performing NR measurements while in LTE IDLE, IDLE with suspended or INACTIVE mode; 2) whether the UE supports performing LTE measurements while in NR IDLE or INACTIVE mode; and/or 3) whether the UE supports performing inter-RAT measurements in a different frequency range, when the UE is camping in one frequency range.

15 Claims, 17 Drawing Sheets

Related U.S. Application Data

(60) Provisional application No. 62/842,097, filed on May 2, 2019.

(51) Int. Cl.

| | |
|---|---|
| *H04W 72/23* | (2023.01) |
| *H04W 76/27* | (2018.01) |
| *H04W 76/30* | (2018.01) |
| *H04W 88/06* | (2009.01) |

(52) U.S. Cl.
CPC .......... *H04W 76/27* (2018.02); *H04W 76/30* (2018.02); *H04W 88/06* (2013.01)

(58) Field of Classification Search
CPC . H04W 88/06; H04W 36/0058; H04W 48/16; H04W 52/0216; H04W 52/0229
See application file for complete search history.

(56) References Cited

U.S. PATENT DOCUMENTS

| | | | | |
|---|---|---|---|---|
| 2015/0327269 | A1* | 11/2015 | Kim ........................ | H04W 8/24 |
| | | | | 370/329 |
| 2018/0199251 | A1* | 7/2018 | Kim ................... | H04W 36/0066 |
| 2020/0045767 | A1* | 2/2020 | Velev ....................... | H04W 8/22 |
| 2020/0221290 | A1* | 7/2020 | Wiemann .......... | H04W 72/0453 |
| 2020/0267668 | A1* | 8/2020 | Xu .................... | H04W 72/0446 |
| 2020/0314946 | A1* | 10/2020 | Tsuboi .................. | H04W 24/10 |
| 2021/0099895 | A1* | 4/2021 | Hong ...................... | H04W 4/80 |
| 2021/0219163 | A1* | 7/2021 | Sha ........................ | H04W 76/27 |
| 2021/0345095 | A1 | 11/2021 | Wang | |

OTHER PUBLICATIONS

International Preliminary Report on Patentability dated Jun. 17, 2021 in International Application No. PCT/IB2020/054154 (35 pages total).

3GPP TS 38.331 V15.5.0, 3rd Generation Partnership Project; Technical Specification Group Radio Access Network; NR; Radio Resource Control (RRC) protocol specification (Release 15), Sophia-Antipolis Cedex, France, Mar. 2019, XP051723314 (491 pages total).

3GPP TS 36.331 V15.5.1, 3rd Generation Partnership Project; Technical Specification Group Radio Access Network; Evolved Universal Terrestrial Radio Access (E-UTRA); Radio Resource Control (RRC); Protocol specification (Release 15), Sophia-Antipolis Cedex, France, Apr. 2019, XP051723678 (948 pages total).

Samsung, "Introducing Make-Before-Break in NR," Change Request R2-1905059, 3GPP TSG-RAN WG2#105bis, Xian, China Apr. 2019 (11 pages total).

NC2020/0008200—Description, PCT/SE2018/050097, Jul. 1, 2020 (68 pages).

Huawei, et al., "Early measurement configuration/reporting in LTE and NR RRC_IDLE," 3GPP TSG RAN WG2 1 Meeting #105, Document R2-1901612, Feb. 25-Mar. 1, 2019 (3 pages).

* cited by examiner

700 s702

Receive capability request message 820 s704

Generate capability response message 822 s706

Transmit the capability response message 822 s708

Receive command message s710

Enter an IDLE state and perform measurements in accordance with measurement configuration, if any, included in the command message

900 s902

Transmit a capability request message 820 to UE 802 s904

Receive a capability response message transmitted by the UE in response to the request message s906

Generate a control message (e.g., RRCConnectionRelease)

s908

Transmit the control message to the UE

PROVIDING MEASUREMENT CAPABILITIES TO A NETWORK NODE

CROSS-REFERENCE TO RELATED APPLICATIONS

This application is a continuation of U.S. application Ser. No. 17/608,217, filed on 2021 Nov. 2 (now U.S. Pat. No. 11,991,703, issued on 2024 May 21), which is a 35 U.S.C. § 371 National Stage of International Patent Application No. PCT/IB2020/054154, filed 2020 May 1, which claims priority to U.S. provisional application No. 62/842,097, filed on 2019 May 2. The above identified applications are incorporated by reference.

TECHNICAL FIELD

This disclosure relates to ways to enable a network node to determine measurement capabilities of a user equipment (UE).

BACKGROUND

Carrier Aggregation (CA) and Dual Connectivity (DC) in LTE

In 3GPP Release 10 (Rel-10), CA was introduced in Long Term Evolution (LTE) to enable a UE to transmit/receive information via multiple cells (so called Secondary Cells-SCell(s)) from multiple carrier frequencies, to benefit of the existence of non-contiguous and contiguous carriers. In CA terminology, the PCell is the cell towards which the UE established the RRC connection or did handover to. In CA, cells are aggregated on MAC-level. MAC gets grants for a certain cell and multiplexes data from different bearers to one Transport Block being sent on that cell. Also, MAC controls how that process is done. This is illustrated in FIG. 1.

SCells can be "added" (a.k.a. "configured") for the UE using RRC signaling (e.g. an RRCConnectionReconfiguration message), which takes in the order of 100s of milliseconds. A cell which is configured for the UE becomes a "serving cell" for this UE. An SCell may also be associated to an SCell state. When configured/added via RRC, an Scell starts in a deactivated state. In LTE Rel-15, the eNB can indicate to activate-upon-configuration, or change the state, at least in RRCConnectionReconfiguration, as shown in the table below:

MAC Control Element (MAC CE) can be used to change the SCell state between the three states as shown in FIG. 2. There are also timers in MAC to move a cell between deactivated/activated/dormant. These timers are: a) sCell-HibernationTimer; which moves the SCell from activated state to dormant state, b) sCellDeactivationTimer; which moves the SCell from activated state to deactivated state, and c) dormantSCellDeactivationTimer; which moves the SCell from dormant state to deactivated state. The MAC level SCell activation takes in the order of 20-30 ms.

Once the network (e.g., base station) determines there is a need to configure and/or activate CA, the question is which cells to initially configure and/or activate, if they are configured, and/or whether a cell/carrier is good enough in terms of radio quality/coverage (e.g. RSRP and RSRQ). To understand the conditions on SCell(s) or potential SCell(s) in a given available carrier the network may configure the UE to perform radio resource management (RRM) measurements (see message 301 in FIG. 3).

Typically, the network may be assisted by RRM measurements to be reported by a UE (see message 302 in FIG. 3). The network may configure the UE with measurement IDs associated to reportConfig with event A1 (Serving becomes better than threshold) in case this is a configured SCell, or A4 (Neighbor becomes better than threshold) for carriers without a configured SCell. The measurement objects are associated to the carrier the network wants reports on. If network is aware of the exact cells it wants the UE to measure, a so-called white cell list can be configured in the measurement object so that the UE is only required to measure these cells in that carrier.

With the later introduction of Dual Connectivity in Rel-12, it was possible to add what is called a Secondary Cell Group (SCG) configuration to the UE. The main benefit would be that the UE could in principle add a cell from another eNB. Protocol wise, that would require different MAC entities, one for each cell group. The UE will have two cell groups, one associated to the PCell (master node) and another associated to a PScell (of the secondary eNodeB), where each group may possibly have their own associated SCells.

When it comes to adding SCells, when the UE is in single connectivity, just to exemplify, the RRCConnectionReconfiguration message may carry a cell index (so MAC identifiers are optimized, i.e., shorter), cell identifier and carrier frequency, common parameters, and, state information, later

---

```
1>for each SCell configured for the UE other than the PSCell:
  2>if the received RRCConnectionReconfiguration message includes sCellState for the
    SCell and indicates activated:
    3>configure lower layers to consider the SCell to be in activated state;
  2>else if the received RRCConnectionReconfiguration message includes sCellState for the
    SCell and indicates dormant:
    3>configure lower layers to consider the SCell to be in dormant state;
  2>else:
    3>configure lower layers to consider the SCell to be in deactivated state;
```

---

In LTE rel-15, a new intermediate state (called dormant state) between the deactivated and active state has been introduced for enhanced uplink operation (see FIG. 2). A introduced in Rel-15 (activated or dormant). The table below illustrates information that may be contained in the RRC-ConnectionReconfiguration message.

---

```
SCellToAddModList-r10 ::=        SEQUENCE(SIZE(1 . . . maxSCell-r10) ) OF SCellToAddMod-r10
SCellToAddMod-r10 ::=           SEQUENCE {
  sCellIndex-r10                  SCellIndex-r10,
  cellIdentification-r10          SEQUENCE {
```

-continued

```
   physCellId-r10                        PhysCellId,
   dl-CarrierFreq-r10                    ARFCN-ValueEUTRA
} OPTIONAL,-- Cond SCellAdd
radioResourceConfigCommonSCell-r10              RadioResourceConfigCommonSCell-r10
OPTIONAL, -- Cond SCellAdd
   radioResourceConfigDedicatedSCell-r10          RadioResourceConfigDedicatedSCell-
r10 OPTIONAL, -- Cond SCellAdd2
   . . . ,
   [ [ dl-CarrierFreq-v1090              ARFCN-ValueEUTRA-v9e0 OPTIONAL -- Cond
EARFCN-max
   ] ] ,
   [ [ antennaInfoDedicatedSCell-v10i0         AntennaInfoDedicated-v10i0 OPTIONAL
-- Need ON
   ] ] ,
   [ [ srs-SwitchFromServCellIndex-r14          INTEGER (0 . . . 31) OPTIONAL -- Need
ON
   ] ] ,
   [ [ sCellState-r15                    ENUMERATED {activated, dormant}
   OPTIONAL -- Need ON
   ] ]
}
```

Inter-RAT and Inter 5GC Interworking in LTE and NR 5G in 3GPP introduce both a new core network (5GC) and a new Radio Access Network (NR). The core network, 5GC, will however, also support RATs other than just NR. It has been agreed that LTE (or E-UTRA) should also be connected to 5GC. LTE base stations (a.k.a., "eNBs") that are connected to 5GC is called ng-eNB and is part of NG-RAN which also consist of NR base stations (a.k.a., "gNBs"). FIG. 4 shows how the base stations are connected to each other and the nodes in 5GC.

There are different ways to deploy a 5G network with or without interworking with LTE (also referred to as E-UTRA) and evolved packet core (EPC), as depicted in FIG. 5. In principle, NR and LTE can be deployed without any interworking, denoted by NR stand-alone (SA) operation, that is gNB in NR can be connected to 5G core network (5GC) and eNB can be connected to EPC with no interconnection between the two (Option 1 and Option 2 in FIG. 5). On the other hand, the first supported version of NR is the so-called EN-DC (E-UTRAN-NR Dual Connectivity), illustrated by Option 3. In such a deployment, dual connectivity between NR and LTE is applied with LTE as the master and NR as the secondary node. The RAN node supporting NR (i.e., the gNB), may not have a control plane connection to the EPC, instead it relies on the LTE as master node (MeNB). This is also called "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, option 2 supports stand-alone NR deployment where gNB is connected to 5GC. Similarly, LTE can also be connected to 5GC using option 5 (also known as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that, Option 4 and option 7 are other variants of dual connectivity between LTE and NR which will be standardized as part of NG-RAN connected to 5GC, denoted by MR-DC (Multi-Radio Dual Connectivity). Under the MR-DC umbrella, we have:

(1) EN-DC (Option 3): LTE is the master node and NR is the secondary (EPC CN employed);

(2) NE-DC (Option 4): NR is the master node and LTE is the secondary (5GCN employed);

(3) NGEN-DC (Option 7): LTE is the master node and NR is the secondary (5GCN employed); and (4) NR-DC (variant of Option 2): Dual connectivity where both the master and secondary are NR (5GCN employed).

As migration for these options may differ from different operators, it is possible to have deployments with multiple options in parallel in the same network e.g. there could be eNB base station supporting options 3, 5 and 7 in the same network as NR base station supporting 2 and 4. In combination with dual connectivity solutions between LTE and NR it is also possible to support CA (Carrier Aggregation) in each cell group (i.e. MCG and SCG) and dual connectivity between nodes on same RAT (e.g. NR-NR DC). For the LTE cells, a consequence of these different deployments is the co-existence of LTE cells associated to eNBs connected to EPC, 5GC or both EPC/5GC.

Suspend/Resume in LTE and Relation to CA/SCell and SCG Additions

A very typical use case is a UE with some burst traffic that comes and goes (e.g. some video packets, idle periods of transmission/reception, then comes live again). To save UE power, the network transitions the UE from connected mode to idle mode during these periods. Then, UE comes back again (either via paging or UE request to get connected) and accesses the network.

In LTE Rel-13, a mechanism was introduced for the UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of as prior to establish the RRC connection from scratch. Reducing the signaling could have several benefits, including reduce latency (e.g. for smart phones accessing Internet) and reduced signaling leads to reduce battery consumption for machine type devices sending very little data.

The Rel-13 solution is based on that the UE sends a RRCConnectionResumeRequest message to the network and in response may receive an RRCConnectionResume from the network. The RRCConnectionResume is not encrypted but integrity protected.

The resume procedure in LTE can be found in the RRC specifications (3GPP TS 36.331). As the UE performing resume is in RRC_IDLE (with suspended AS context), that triggers a transition from RRC_IDLE to RRC_CON-NECTED. Hence, that is modelled in the specifications in the same subclause that captures the RRC connection estab-lishment (subclause 5.3.3 RRC connection establishment).

There are few things relevant to highlight in the SCG configurations and SCell configurations for MCGs in rela-tion to suspend/resume procedures. Upon suspension, it is defined that the UE stores its used RRC configuration. In other words, if the UE is operating in any dual connectivity mode (and has an SCG configuration) or just having con-figured SCells in the MCG, it shall store all these configu-rations. However, upon resuming, at least until Rel-15, it is defined that the UE shall release the SCG configurations and SCell configurations, as shown in the table below:

Existing solution for early measurements upon idle to connected transition in LTE (Rel-15)

In LTE Rel-15, it is possible to configure the UE to report so called early measurements upon the transition from idle to connected state. These measurements are measurements that the UE can perform in idle state, and according to a configuration provided by the source cell with the intention to receive these measurements immediately after the UE gets connected and quickly setup CA and/or other forms of DC (e.g. EN-DC, MR-DC, etc.) without the need to first provide a measurement configuration (measConfig) in RRC_CONNECTED, as shown in previous sections, and wait for hundreds of milliseconds until first samples are collected, monitored and then the first reports are triggered and transmitted to the network.

---

5.3.3.2 Initiation

The UE initiates the procedure when upper layers request establishment or resume of an RRC connection while the UE is in RRC IDLE or when upper layers request resume of an RRC connection or RRC layer requests resume of an RRC connection for, e.g. RNAU or reception of RAN paging while the UE is in RRC INACTIVE.

. . .

Except for NB-IoT, upon initiating the procedure, if connected to EPC or 5GC, the UE shall:
    1>if the UE is resuming an RRC connection from a suspended RRC connection or from
      RRC_INACTIVE:
        2>if the UE is resuming an RRC connection from a suspended RRC connection:
            3>if the UE was configured with EN-DC:
                4>perform EN-DC release, as specified in TS 38.331 [82], clause 5.3.5.10;
        2>release the MCG SCell(s), if configured, in accordance with 5.3.10.3a;
        . . .
        2>release the entire SCG configuration, if configured, except for the DRB configuration
           (as configured by drb-ToAddModListSCG);

---

Hence, when the UE comes from RRC_IDLE with the context, if network wants to add SCell(s) to the MCG or add an SCG, it needs to do that from scratch, even if the UE is suspending and resuming in the same cell/area where all the previous PCell and SCell configurations are still valid from a radio conditions perspective.

As the use case of UEs with burst traffic constantly being suspended and resuming in the same cell is quite typical, 3GPP has standardized a solution in LTE to enable the UE to assist the network with measurements performed while the UE is in RRC_IDLE so that the network could speed up the setup of carrier aggregation or dual connectivity. The solutions are described below.

Measurement Configuration for Early Measurements Upon Resume in LTE

A first aspect of the existing solution, as standardized in EUTRA 36.331, is described in 5.6.20 Idle Mode Measure-ments. The UE can receive these idle mode measurement configurations in the system information (SIB5) in the field MeasIdleConfigSIB-r15, indicating up to 8 cells or ranges of cell IDs to perform measurements on. In addition, the UE can be either configured upon the transition from RRC_CO-NNECTED to RRC_IDLE with a dedicated measurement configuration in the RRCConnectionRelease message with the measIdleDedicated-r15 which overrides the broadcasted configurations in SIB5. The broadcasted and dedicated sig-naling is shown in the tables below:

---

RRCConnectionRelease message

```
-- ASN1START
RRCConnectionRelease ::=                   SEQUENCE {
    rrc-TransactionIdentifier                   RRC-TransactionIdentifier,
    criticalExtensions                      CHOICE {
    cl                                      CHOICE {
        rrcConnectionRelease-r8                 RRCConnectionRelease-r8-IEs,
        spare3 NULL, spare2 NULL, spare1NULL
    },
    criticalExtensions Future               SEQUENCE { }
    }
}
-- other info has been omitted
RRCConnectionRelease-v1530-IEs ::=             SEQUENCE {
    drb-ContinueROHC-r15                    ENUMERATED {true} OPTIONAL, -- Cond UP-EDT
    nextHopChainingCount-r15               NextHopChainingCount OPTIONAL, -- Cond UP-EDT
    measIdleConfig-r15                     MeasIdleConfigDedicated-r15 OPTIONAL, -- Need ON
    rrc-InactiveConfig-r15                 RRC-InactiveConfig-r15 OPTIONAL, -- Need OR
```

-continued

| RRCConnectionRelease message | |
|---|---|
| cn-Type-r15 | ENUMERATED {epc,fivegc} OPTIONAL, -- Need OR |
| nonCriticalExtension | SEQUENCE { } OPTIONAL |
| } | |
| -- ASN1STOP | |

| MeasIdleConfig information element | |
|---|---|
| -- ASN1START | |
| MeasIdleConfigSIB-r15 ::= | SEQUENCE { |
| measIdleCarrierListEUTRA-r15 | EUTRA-CarrierList-r15, |
| . . . | |
| } | |
| MeasIdleConfigDedicated-r15 ::= | SEQUENCE { |
| measIdleCarrierListEUTRA-r15 | EUTRA-CarrierList-r15 OPTIONAL, -- Need OR |
| measIdleDuration-r15 | ENUMERATED {sec10, sec30, sec60, sec120, |
| | sec180, sec240, sec300, spare}, |
| . . . | |
| } | |
| EUTRA-CarrierList-r15 ::= | SEQUENCE (SIZE (1 . . . maxFreqIdle-r15) ) OF |
| MeasIdleCarrierEUTRA-r15 | |
| MeasIdleCarrierEUTRA-r15::= | SEQUENCE { |
| carrierFreq-r15 | ARFCN-ValueEUTRA-r9, |
| allowedMeasBandwidth-r15 | AllowedMeasBandwidth, |
| validityArea-r15 | CellList-r15 OPTIONAL,-- Need OR |
| measCellList-r15 | CellList-r15 OPTIONAL, -- Need OR |
| reportQuantities | ENUMERATED {rsrp, rsrq, both}, |
| qualityThreshold-r15 | SEQUENCE { |
| idleRSRP-Threshold-r15 | RSRP-Range OPTIONAL, -- Need OR |
| idleRSRQ-Threshold-r15 | RSRQ-Range-r13 OPTIONAL -- Need OR |
| } | OPTIONAL, -- Need OR |
| . . . | |
| } | |
| CellList-r15 ::= | SEQUENCE (SIZE (1 . . . maxCellMeasIdle-r15) ) OF |
| PhysCellIdRange | |
| -- ASN1STOP | |

| MeasidleConfig field descriptions |
|---|
| allowedMeasBandwidth |
| If absent, the value corresponding to the downlink bandwidth indicated by the dl-Bandwidth |
| included in MasterInformationBlock of serving cell applies. |
| carrierFreq |
| Indicates the E-UTRA carrier frequency to be used for measurements during IDLE mode. |
| measIdleCarrierListEUTRA |
| Indicates the E-UTRA carriers to be measured during IDLE mode. |
| measIdleDuration |
| Indicates the duration for performing measurements during IDLE mode for measurements assigned via |
| RRCConnectionRelease. Value sec10 correspond to 10 seconds, value sec30 to 30 seconds and so on. |
| qualityThreshold |
| Indicates the quality thresholds for reporting the measured cells for IDLE mode measurements. |
| reportQuantities |
| Indicates which measurment quantities UE is requested to report in the IDLE mode measurement report. |
| measCellList |
| Indicates the list of cells which the UE is requested to measure and report for IDLE mode measurements. |
| validityArea |
| Indicates the list of cells within which UE is requested to do IDLE mode measurements. |
| If the UE reselects to a cell outside this list, the measurements are no longer required. |

Carrier Information and Cell List

The UE is provided with a list of carriers and optionally with a list of cells that the UE shall perform measurements. The fields s-NonIntraSearch in SystemInformationBlock-Type3 do not affect the UE measurement procedures in IDLE mode.

Timer T331

Upon the reception of that measurement configuration, the UE starts a timer T331 with the value provided in measIdleDuration, which can go from 0 to 300 seconds. The timer stops upon receiving RRCConnectionSetup, RRCConnectionResume which indicates a transition to RRC_CONNECTED. That concept exists to limit the amount of time the UE perform measurements for the purpose of early measurements.

Validity Area

Another concept introduced in the LTE rel-15 solution is a validity area, which comprises a list of PCIs. The intention is to limit the area where CA or DC may be setup later when the UE resumes/setups the connection, so the early measurements are somewhat useful for that purpose. If validity Area is configured, and UE reselects to a serving cell whose PCI does not match any entry in validity Area for the corresponding carrier frequency, the timer T331 is stopped. Then, UE stops to perform IDLE measurements and releases the configuration (i.e. VarMeasIdleConfig). Notice that this does not necessarily imply that the UE releases the idle measurements that were configured in Release and that were performed i.e. these may still be stored and possibly requested by the network. In addition, the UE may continue with IDLE mode measurements according to the broadcasted SIB5 configuration after the timer T331 has expired or stopped.

Minimum Quality Threshold

Notice also that only measurements above a certain threshold shall be stored as the cell candidates for CA setup needs to be within a minimum acceptable threshold. How the UE performs measurements in IDLE mode is up to UE implementation as long as RAN4 requirements for measurement reporting defined in 36.133 are met.

The UE behaviour in more details is shown in the table below as captured in 36.331:

Indication of Available Early Measurements Upon Resume/Setup in LTE

Another aspect of the existing solution occurs when the UE tries to resume or setup a call from RRC_IDLE without context. If the previous step is performed, i.e., if the UE is configured to store idle measurements, the network may request the UE after resume/setup (after security is activated) whether the UE has idle measurements available.

In the case the UE is setting up a connection coming from RRC_IDLE without the AS Context, the network is not aware that the UE has available measurements stored. Then, to allow the network to know that, and possibly request the UE to report early measurements, the UE may indicate the availability of stored idle measurements in RRCConnectionSetupComplete. As not all cells would support the feature anyway, the UE only includes that availability information if the cell broadcasts in SIB2 the idleModeMeasurements indication. The flag in RRCReconnectionSetupComplete and procedure text are shown in the tables below:

---

5.6.20     Idle Mode Measurements
5.6.20.1    General
This procedure specifies the measurements done by a UE in RRC_IDLE when it has an IDLE mode measurement configuration and the storage of the available measurements by a UE in both RRC_IDLE and RRC_CONNECTED.
5.6.20.2    Initiation
While T331 is running, the UE shall:
1>       perform the measurements in accordance with the following:
2>       for each entry in measIdleCarrierListEUTRA within VarMeasIdleConfig:
3>       if UE supports carrier aggregation between serving carrier and the carrier frequency and bandwidth indicated by carrierFreq and allowedMeasBandwidth within the corresponding entry;
4>       perform measurements in the carrier frequency and bandwidth indicated by carrierFreq and allowedMeasBandwidth within the corresponding entry;
NOTE: The fields s-NonIntraSearch in SystemInformationBlockType3 do not affect the UE measurement procedures in IDLE mode. How the UE performs measurements in IDLE mode is up to UE implementation as long as the requirements in TS 36.133 [16] are met for measurment reporting. UE is not required to perform idle measurements if SIB2 idle measurement indication is not configured.
4>       if the measCellList is included:
5>       consider PCell and cells identified by each entry within the measCellList to be applicable for idle mode measurement reporting;
4>       else:
5>       consider PCell and up to maxCellMeasIdle strongest identified cells whose RSRP/RSRQ measurement results are above the value(s) provided in qualityThreshold (if any) to be applicable for idle mode measurement reporting;
4>       store measurement results for cells applicable for idle mode measurement reporting within the VarMeasIdleReport;
3>       else:
4>       do not consider the carrier frequency to be applicable for idle mode measurement reporting;
1>       if validityArea is configured in VarMeasIdleConfig and UE reselects to a serving cell whose physical cell identity does not match any entry in validityArea for the corresponding carrier frequency:
2>       stop T331;
5.6.20.3    T331 expiry or stop
The UE shall:
1>       if T331 expires or is stopped:
2>       release the VarMeasIdleConfig;
NOTE: It is up to UE implementation whether to continue IDLE mode measurements according to SIB5 configuration after T331 has expired or stopped.

---

```
RRCConnectionSetupComplete-v1530-IEs : := SEQUENCE {
  logMeasAvailableBT-r15         ENUMERATED {true} OPTIONAL,
  logMeasAvailableWLAN-r15       ENUMERATED {true} OPTIONAL,
  idleMeasAvailable-r15          ENUMERATED {true} OPTIONAL,
  flightPathInfoAvailable-r15    ENUMERATED {true} OPTIONAL,
  connectTo5GC-r15               ENUMERATED {true} OPTIONAL,
  registeredAMF-r15              RegisteredAMF-r15 OPTIONAL,
  s-NSSAI-list-r15               SEQUENCE(SIZE (1 . . . maxNrofS-NSSAI-r15)) OF S-
                                    NSSAI-r15 OPTIONAL,
  ng-5G-S-TMSI-Bits-r15          CHOICE {
  ng-5G-S-TMSI-r15                 NG-5G-S-TMSI-r15,
  ng-5G-S-TMSI-Part2-r15           BIT STRING (SIZE (8))
  }    OPTIONAL,
  nonCriticalExtension RRCConnectionSetupComplete-v1540-IEs OPTIONAL
}
```

5.3.3.4    Reception of the RRCConnectionSetup by the UE
        NOTE 1: Prior to this, lower layer signalling is used to allocate a
        C-RNTI. For further details see TS 36.321 [8];
The UE shall:
  1> if the RRCConnectionSetup is received in response to an
     RRCConnectionResumeRequest from a suspended RRC connection:
     . . .
  1> set the content of RRCConnectionSetupComplete message as follows:
     2> if the RRCConnectionSetup is received in response to an
        RRCConnectionResumeRequest:
        . . .
     2> if the UE is connected to EPC:
        3> except for NB-IoT:
           . . .
           4> if the SIB2 contains idleModeMeasurements, and the UE has IDLE
              mode measurement information available in VarMeasIdleReport:
              5> include the idleMeasAvailable;
           4> stop T331 (if running);
           . . .
        3> for NB-IoT:
           4> if the UE supports serving cell idle mode measurements reporting
              and servingCellMeasInfo is present in SystemInformationBlockType2-
              NB:
              5> set the measResultServCell to include the measurements of the
                 serving cell;
           NOTE 2: The UE includes the latest results of the serving cell
           measurements as used for cell selection/reselection evaluation,
           which are performed in accordance with the performance requirements
           as specified in TS 36.133 [16].
        3> include dcn-ID if a DCN-ID value (see TS 23.401 [41]) is received
           from upper layers;

In the case this UE is setting up a connection coming from RRC_IDLE but with a stored AS Context (i.e. resume from suspended), the network may be aware that the UE may have available idle measurements stored after checking the fetched context from the source node where the UE got suspended. However, it is still not certain that the UE has measurements available since the UE is only required to perform the measurements if the cells are above the configured RSRP/RSRQ thresholds and while it performs cell selection/cell reselection within the configured validity area.

Then, to allow the network to know that, and possibly request the UE to report early measurements, the UE may also indicate the availability of stored idle measurements in RRCConnectionResumeComplete. As not all cells would support the feature anyway, the UE only includes that availability information if the cell broadcasts in SIB2 the idleModeMeasurements indication. The flag in RRCReconnectionResumeComplete and procedure text are shown in the tables below:

```
RRCConnectionResumeComplete-v1530-IEs : := SEQUENCE {
  logMeasAvailableBT-r15      ENUMERATED {true}        OPTIONAL,
  logMeasAvailableWLAN-r15    ENUMERATED {true}        OPTIONAL,
  idleMeasAvailable-r15       ENUMERATED {true}        OPTIONAL,
  flightPathInfoAvailable-r15    ENUMERATED {true}        OPTIONAL,
  nonCriticalExtension           SEQUENCE {}             OPTIONAL
}
```

5.3.3.4a       Reception of the RRCConnectionResume by the UE
The UE shall:
  . . .
  1> set the content of RRCConnectionResumeComplete message as follows:
     2>except for NB-IoT:
        . . .
        3> if the SIB2 contains idleModeMeasurements, and the UE has IDLE mode
           measurement information available in VarMeasIdleReport:
           4>include the idleMeasAvailable;
        3> stop T331 (if running);
     2> for NB-IoT:

-continued

```
    3> if the UE supports serving cell idle mode measurements reporting and
        servingCellMeasInfo is present in SystemInformationBlockType2-NB:
        4> set the measResultServCell to include the measurements of the
            serving cell;
        NOTE: The UE includes the latest results of the serving cell
        measurements as used for cell selection/reselection evaluation,
        which are performed in accordance with the performance requirements
        as specified in TS 36.133 [16].
    1> submit the RRCConnectionResumeComplete message to lower layers for
        transmission;
    1> the procedure ends.
```

Reporting of Early Measurements Upon Resume/Setup in LTE

Once the UE indicates to the target cell upon resume or setup that idle measurements are available, the network may request the UE to report these available measurements by including the field idleModeMeasurementReq in the UEInformationRequest message transmitted to the UE. Then, the UE responds with a UEInformationResponse containing these measurements (see FIG. 6).

Reception of the UEInformationRequest Message

Upon receiving the UEInformationRequest message, the UE shall, only after successful security activation and if the idleModeMeasurementReq is included in the UEInformationRequest and the UE has stored VarMeasIdleReport: i) set the measResultListIdle in the UEInformationResponse message to the value of idleMeasReport in the VarMeasIdleReport; and ii) discard the VarMeasIdleReport upon successful delivery of the UEInformationResponse message confirmed by lower layers.

The UEInformationResponse message is illustrated in the table below:

```
-- ASN1START
UEInformationResponse-r9 : :=     SEQUENCE {
    rrc-TransactionIdentifier        RRC-TransactionIdentifier,
    criticalExtensions               CHOICE {
        c1                           CHOICE {
            ueInformationResponse-r9         UEInformationResponse-r9-IEs,
            spare3 NULL, spare2 NULL, spare1 NULL
```

-continued

```
    },
        criticalExtensionsFuture           SEQUENCE {}
    }
}
UEInformationResponse-v1530-IEs : := SEQUENCE {
    measResultListIdle-r15             MeasResultListIdle-r15 OPTIONAL,
    flightPathInfoReport-r15           FlightPathInfoReport-r15 OPTIONAL,
    nonCriticalExtension               SEQUENCE { }      OPTIONAL
}
```

Early Measurements in Rel-16 (LTE and NR)

In LTE and NR rel-16, under the WI on CA and DC enhancements, discussions have started regarding the adoption of (an enhanced version of) the idle measurement concept also in NR (and enhancing it for LTE as well). In RAN2 #105 meeting in Athens, it was agreed that For IDLE/INACTIVE:

1) Rel-16 early measurement configuration may contain both NR and LTE configuration, only NR configuration or only LTE configuration, to support various MR-DC and CA scenario. FFS on details. IDLE mode and INACTIVE mode details will be discussed separately;

2) NR early measurement configuration should include NR specific measurement parameters configurations;

3) Available beam and cell level measurement results can be included in early measurement reporting if configured.

Thus, the idle mode measurement configuration in LTE rel-16 will probably end up like shown in the table below:

```
MeasIdleConfigDedicated-r16 : := SEQUENCE {
    measIdleCarrierListEUTRA-r16    EUTRA-CarrierList-r15 OPTIONAL, -- Need OR
    measIdleCarrierListNR-r16       NR-CarrierList-r15 OPTIONAL, -- Need OR
    measIdleDuration-r16            ENUMERATED {sec10, sec30, sec60, sec120,
                                        sec180, sec240, sec300, spare} ,
    . . .
}
```

In NR, we will also have idle/inactive measurement configuration for EUTRA and NR carriers.

SUMMARY

In LTE rel-15, the IRAT-ParametersNR-r15 IE provides information as to whether or not a UE supports EN-DC as shown in the table below:

```
IRAT-ParametersNR-r15 : := SEQUENCE {
    en-DC-r15                            ENUMERATED {supported} OPTIONAL,
    eventB2-r15                          ENUMERATED {supported} OPTIONAL,
    supportedBandListEN-DC-r15 SupportedBandListNR-r15    OPTIONAL
}
```

From this IE, the network will know whether the UE supports EN-DC or not, and thus will configure the UE for measurements/events related to EN-DC setup only if the UE supports it.

Also, there are UE capability IEs (ca-IdleModeMeasurements-r15 and ca-IdleModeValidity Area-r15) indicating whether the UE supports idle mode measurements or not, as shown below:

```
MeasParameters-v1530 : :=            SEQUENCE {
   qoe-MeasReport-r15               ENUMERATED {supported} OPTIONAL,
   qoe-MTSI-MeasReport-r15          ENUMERATED {supported} OPTIONAL,
   ca-IdleModeMeasurements-r15       ENUMERATED {supported} OPTIONAL,
   ca-IdleModeValidityArea-r15       ENUMERATED {supported} OPTIONAL,
   heightMeas-r15                  ENUMERATED {supported} OPTIONAL,
   multipleCellsMeasExtension-r15     ENUMERATED {supported} OPTIONAL
}
```

This is also used by the network to decide whether to configure the UE with idle mode measurements or not.

With the introduction of NR measurement in the idle mode measurement configuration of LTE rel-16 and LTE measurements in NR rel-16 idle/inactive mode measurement configurations, the network will not be sure whether the UE will also support NR idle mode measurements in LTE just because EN-DC support is indicated via the IRAT-ParametersNR capability indicator.

Similarly in NR rel-15 (in TS 38.331 and TS 38.306), it has been agreed to have a capability IE ("ne-DC") indicating whether NE-DC is supported by the UE (R2-1902800) as shown in the table below.

```
EUTRA-Parameters : :=             SEQUENCE {
   supportedBandListEUTRA          SEQUENCE (SIZE (1 . . . maxBandsEUTRA)) OF
                                               FreqBandIndicatorEUTRA,
   eutra-ParametersCommon          EUTRA-ParametersCommon      OPTIONAL,
   eutra-ParametersXDD-Diff        EUTRA-ParametersXDD-Diff     OPTIONAL,
   . . . ,
   [ [
   ne-DC              ENUMERATED {supported}             OPTIONAL
   ] ]
}
```

Since the idle/inactive measurement concept is not available in NR rel-15, the idle mode measurement capability information IEs that are equivalent to the ones discussed above for LTE do not exist yet.

In LTE rel-15, there is a UE capability indicating whether a UE supports EN-DC or not as shown below:

```
UE-EUTRA-CapabilityAddXDD-Mode-v15x0    : :=   SEQUENCE {
   pdcp-ParametersNR-v15x0                    PDCP-ParametersNR-v15x0,
   irat-ParametersNR-v15x0                    IRAT-ParametersNR-v15x0
}
IRAT-ParametersNR-v15x0 : :=         SEQUENCE {
   ng-en-DC-r15 ENUMERATED {supported} OPTIONAL
}
```

Since the capability indications for support of NE-DC/NE-DC/NGEN-DC were introduced in Rel-15, if idle/inactive measurements are introduced in Rel-16, the network will not be able to deduce from the capability for MR-DC, that the UE supports inter-RAT idle/inactive measurements, even though the UE support inter-RAT measurements in order to set up inter-RAT MR-DC.

Another problem is that the NR frequencies can span a much wider range, and it is not certain that a UE which is camping in LTE is capable of measuring high-band NR (FR2). Similarly, if the UE is camping on high-band NR, it is not certain that the UE is capable of measuring LTE (which is at low band).

While a UE may support EN-DC, it may not support performing NR measurements while in LTE IDLE/IDLE with suspended/INACTIVE mode. Thus, if the network assumes UE supports performing NR measurements just because it has indicated EN-DC support, and sends it an Idle mode measurement configuration that contains NR measurements, it can lead to a state mismatch (i.e. the network expects the UE to report NR measurements but the UE will not perform this reporting) or in the worst case, maybe even a failure. The situation is similar in case the network tries to configure a UE with LTE measurements while in in NR IDLE/INACTIVE mode just because the UE indicates support for NE-DC.

Accordingly, this disclosure propose adding new UE capability information for both LTE and NR so that the network will be able to determine: 1) whether the UE supports performing NR measurements while in LTE IDLE, IDLE with suspended or INACTIVE mode; 2) whether the UE supports performing LTE measurements while in NR IDLE or INACTIVE mode; and/or 3) whether the UE supports performing inter-RAT measurements in a different frequency range, when the UE is camping in one frequency range.

In one aspect there is provided method performed by a UE. The method includes the UE receiving a capability request message transmitted by a network node of a radio access network, RAN, implementing a first radio access technology, RAT, wherein the first RAT is either New Radio, NR, or Long Term Evolution, LTE. in response to receiving the capability request message, the UE generates a capability response message that indicates whether the UE supports a certain type of measurement. The method also includes the UE transmitting the capability response message 822 to the network node 804. If the first RAT is LTE, then i) the capability response message indicates whether the UE supports NR measurements when the UE is in an IDLE mode or IDLE with suspended or INACTIVE mode and/or ii) the capability response message indicates whether the UE supports NR measurements in a first frequency range, FR1, or a second frequency range, FR2. If the first RAT is NR, then i) the capability response message indicates whether the UE supports LTE measurements when the UE is in an IDLE or INACTIVE mode, ii) the capability response message indicates whether the UE supports LTE measurements only if the UE is camping on FR1, and/or iii) the capability response message indicates that when the UE is camping on a second frequency range, FR2, the UE doesn't support LTE measurements.

In another aspect there is provided a computer program comprising instructions which when executed by processing circuitry of a UE causes the UE to perform the above described method. In another aspect there is provided a carrier containing the computer program, where the carrier is one of an electronic signal, an optical signal, a radio signal, and a computer readable storage medium.

In another aspect there is provided a method performed by a network node operating in accordance with a first RAT, where the first RAT is either NR or LTE. The method includes the network node transmitting a capability request message to a UE. The method also includes the network node receiving a capability response message transmitted by the UE in response to the capability request message, wherein the capability response message indicates whether the UE supports a certain type of measurement. The method also includes the network node generating a control message for causing the UE to enter an IDLE mode, wherein the step of generating the control message comprises the network node determining, based on information conveyed by the capability response message, whether to include certain measurement configuration information in the control message. The method further includes the network node transmitting the control message to the UE. If the first RAT is LTE, then i) the capability response message indicates whether the UE supports NR measurements when the UE is in an IDLE mode or IDLE with suspended or INACTIVE mode and/or ii) the capability response message indicates whether the UE supports NR measurements in FR1 or FR2. If the first RAT is NR, then i) the capability response message indicates whether the UE supports LTE measurements when the UE is in an IDLE or INACTIVE mode, ii) the capability response message indicates whether the UE supports LTE measurements only if the UE is camping on a first frequency range, FR1, and/or iii) the capability response message indicates that when the UE is camping on a second frequency range, FR2, the UE doesn't support LTE measurements.

In another aspect there is provided a computer program comprising instructions which when executed by processing circuitry of a network node causes the network to perform the above described method. In another aspect there is provided a carrier containing the computer program, where the carrier is one of an electronic signal, an optical signal, a radio signal, and a computer readable storage medium.

Advantageously, with the introduction of capabilities IEs indicating whether the UE supports performing NR measurements while in LTE IDLE/IDLE with suspended/INACTIVE mode, and similarly, whether the UE supports LTE measurements while in NR IDLE/INACTIVE mode, the ambiguities and possible failure cases mentioned above may be prevented.

According to some embodiments, the following are disclosed: Definition of UE capabilities for determining if the UE supports In LTE; NR measurements during IDLE or IDLE with suspended or INACTIVE modes; Capabilities to differentiate supported measurements in IDLE, IDLE with suspended or INACTIVE mode; Capabilities to differentiate supported measurements for FR1 and FR2 in NR; LTE measurements during IDLE or INACTIVE modes; NR measurements (for DC and CA purposes) during IDLE or INACTIVE modes; Capabilities to differentiate supported measurements in IDLE or INACTIVE mode; Capabilities to differentiate supported measurements in LTE depending on if the UE is camping in FR1 or FR2 in NR.

Additional aspects and embodiments are described herein.

BRIEF DESCRIPTION OF THE DRAWINGS

The accompanying drawings, which are incorporated herein and form part of the specification, illustrate various embodiments.

DETAILED DESCRIPTION

Figure 1:
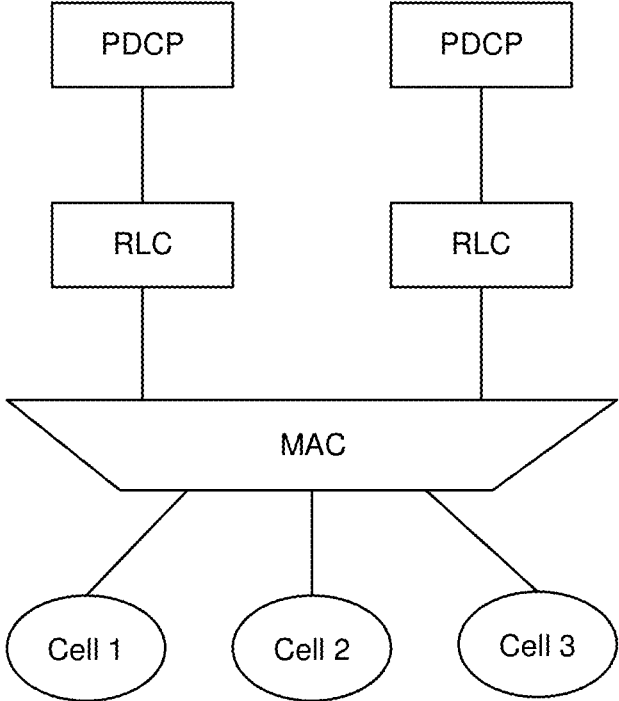
FIG. 1 illustrates cells being aggregated on MAC-level.
Figure 2:
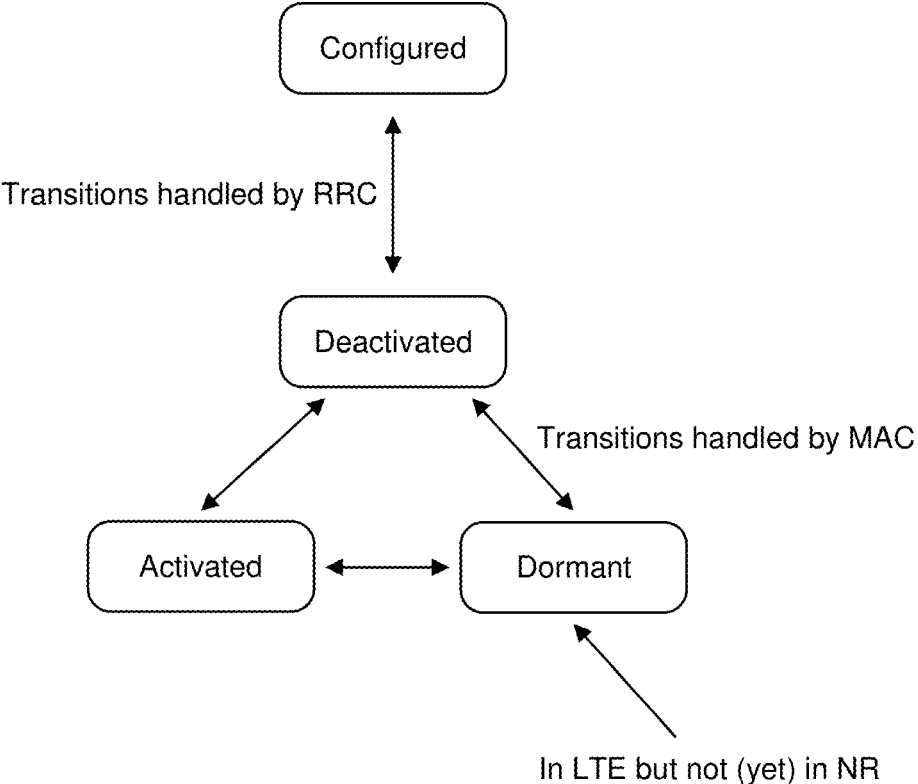
FIG. 2 illustrates an example state diagram.
Figure 3:
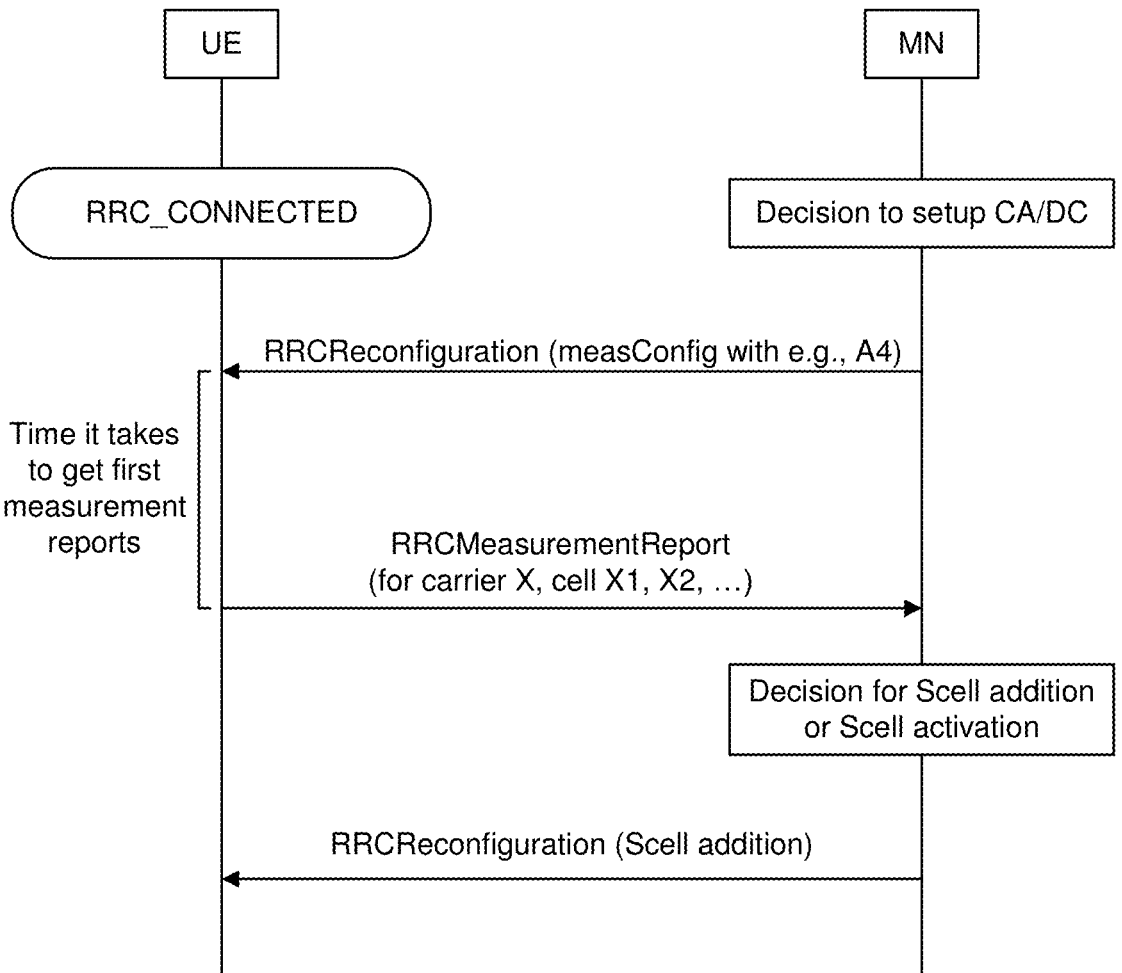
FIG. 3 is a message flow diagram showing RRC message being communicated between a UE and a network.
Figure 4:
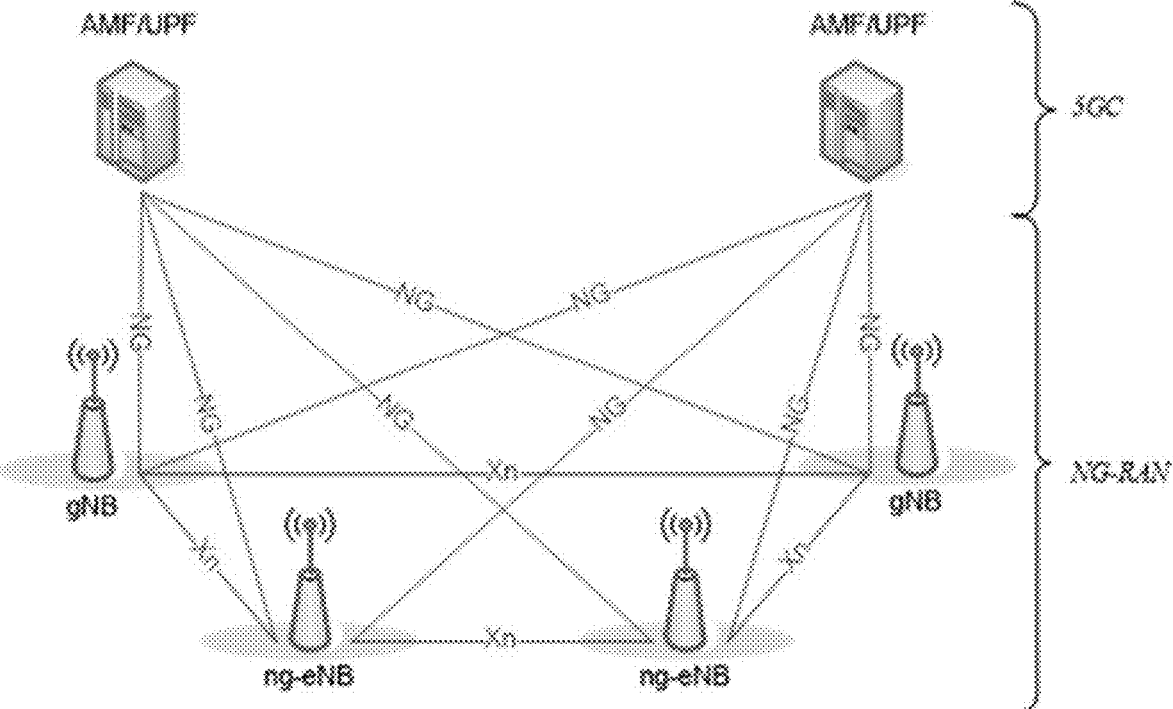
FIG. 4 shows how the base stations are connected to each other and the nodes in 5GC.
Figure 5:
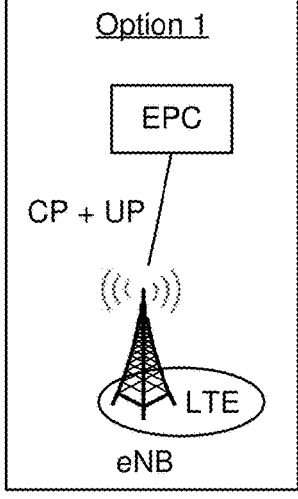
FIG. 5 shows different options for deploying a 5G network.
Figure 5:
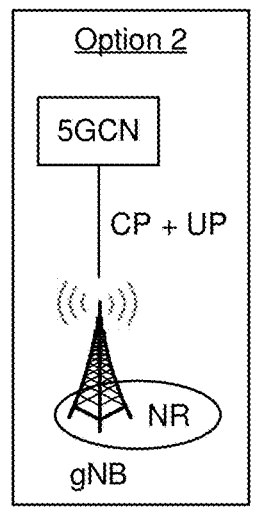
Figure 5:
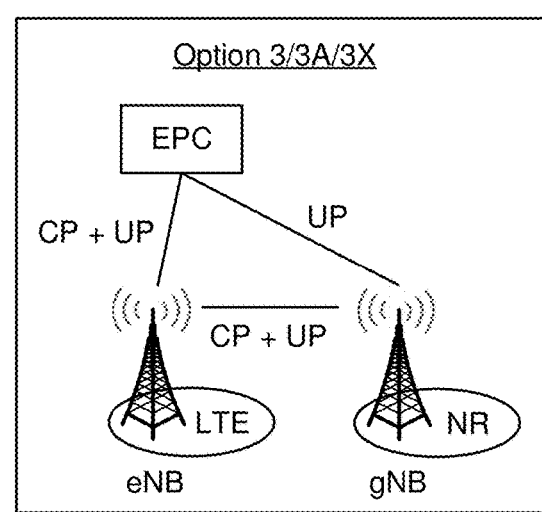
Figure 5:
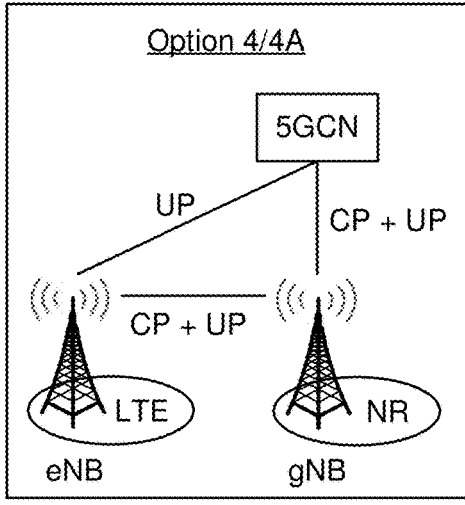
Figure 5:
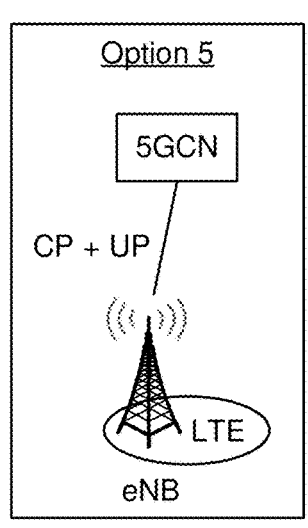
Figure 5:
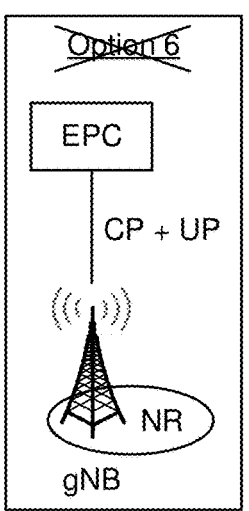
Figure 5:
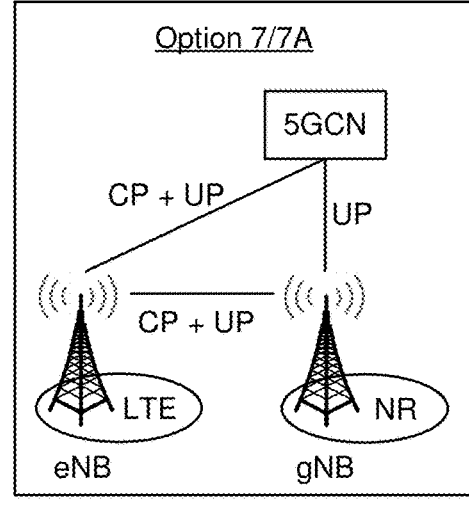
Figure 5:
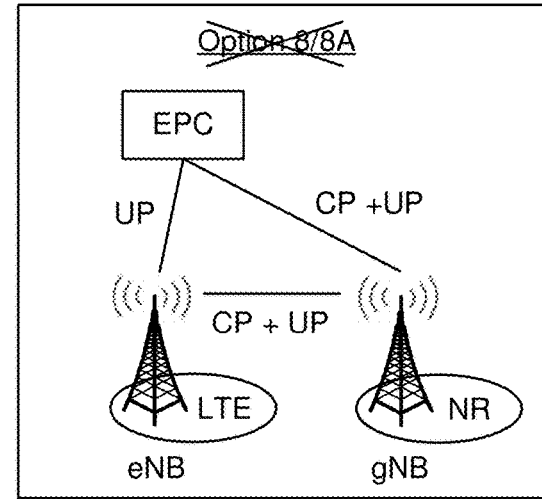
Figure 6:
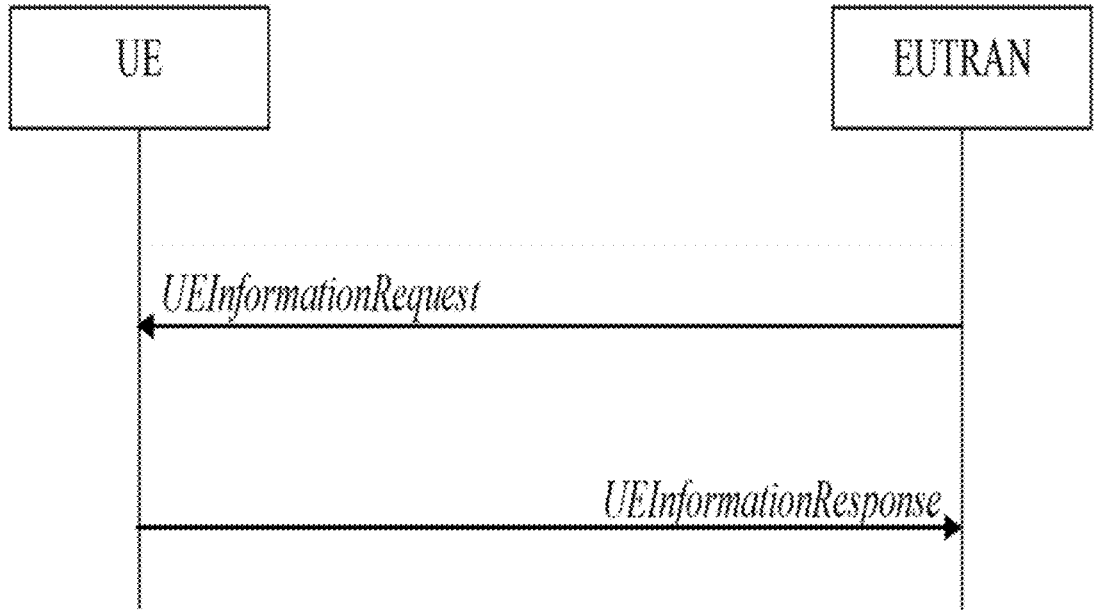
FIG. 6 is a message flow diagram showing RRC message being communicated between a UE and a network.

1. Capabilities for Performing NR Measurements in LTE IDLE/IDLE with Suspended/INACTIVE Modes In one embodiment, the capabilities defined in LTE for a UE's support of IDLE mode measurements are enhanced to indicate the UE's capability to perform NR measurements in IDLE mode. In one embodiment, this is done by introducing new IEs e.g. dc-IdleModeMeasurements and dc-IdleMode Validity Area. For example, as shown in the table below, a measurement parameters IE is updated to include the dc-IdleModeMeasurement IE and the dc-IdleMode Validity Area IE.

```
MeasParameters-v16xx : :=              SEQUENCE {
    qoe-MeasReport-r16                 ENUMERATED {supported}   OPTIONAL,
    qoe-MTSI-MeasReport-r16            ENUMERATED {supported}   OPTIONAL,
    ca-IdleModeMeasurements-r16        ENUMERATED {supported}   OPTIONAL,
    ca-IdleModeValidityArea-r16        ENUMERATED {supported}   OPTIONAL,
    heightMeas-r16                     ENUMERATED {supported}   OPTIONAL,
    multipleCellsMeasExtension-r16     ENUMERATED {supported}   OPTIONAL,
    dc-IdleModeMeasurements-r16        ENUMERATED {supported}   OPTIONAL,
    dc-IdleModeValidityArea-r16        ENUMERATED {supported}   OPTIONAL,
}
```

Additional new IEs may also be added to the measurement parameter IE. In one variant, additional capability indications can also be included, such as:

1) A separate measurement configuration support for IDLE and INACTIVE mode (e.g. ca-InactiveModeMeasurement, dc-InactiveModeMeasurement, ca-InactiveModeValidityArea, dc-InactiveModeValidityArea, etc.);

2) whether the DC related idle measurements (i.e. NR measurements) could be cell level only or both cell and beam level;

3) whether the DC related inactive measurements (i.e. NR measurements) could be cell level only or both cell and beam level.

One such example is shown below:

```
MeasParameters-v1530 : :=             SEQUENCE {
    qoe-MeasReport-r15                ENUMERATED {supported} OPTIONAL,
    qoe-MTSI-MeasReport-r15           ENUMERATED {supported} OPTIONAL,
    ca-IdleModeMeasurements-r15       ENUMERATED {supported} OPTIONAL,
    ca-IdleModeValidityArea-r15       ENUMERATED {supported} OPTIONAL,
    heightMeas-r15                    ENUMERATED {supported} OPTIONAL,
    multipleCellsMeasExtension-r15    ENUMERATED {supported} OPTIONAL
}
MeasParameters-v16xx : :=             SEQUENCE {
    dc-IdleModeMeasurements-r16       ENUMERATED {supported} OPTIONAL,
    dc-IdleModeValidityArea-r16       ENUMERATED {supported} OPTIONAL,
    ca-InactiveModeMeasurements-r16   ENUMERATED {supported} OPTIONAL,
    ca-InactiveModeValidityArea-r16   ENUMERATED {supported} OPTIONAL,
    dc-InactiveModeMeasurements-r16   ENUMERATED {supported} OPTIONAL,
    dc-InactiveModeValidityArea-r16   ENUMERATED {supported} OPTIONAL,
}
```

Note that in the above it is shown either common or differentiated the IDLE and INACTIVE measurement and validity area configurations. It is also possible to have a common measurement config, but separate validity areas for the IDLE and INACTIVE modes, or vice versa (i.e. common validity area but separate measurement configs).

A further extension of the capabilities can also be considered, where there is a differentiation between the IDLE and IDLE with suspended modes as well (e.g. the UE may have more strict power consumption limitations in IDLE as compared to IDLE with suspended mode, and as such may not be able to perform detailed beam level measurements). Even further capability differentiation can be envisioned where the differentiation could be also on more detailed aspects such as the number of frequency layers/cells that the UE can support to measure during IDLE or IDLE with suspended mode or INACTIVE mode, etc.

Using the capability information provided by the UE, the network (NR) will be able to configure the proper idle/inactive mode measurements that are compatible to the UE's capability. For example, the network (e.g., base station) will not configure the UE with NR measurements if the UE does not support performing such measurements in the mode that the UE is being transitioned to, e.g., via RRCConnectionRelease.

2. Capabilities for Performing LTE Measurements in NR IDLE/INACTIVE Modes

Since NR supports both CA and DC between two NR carriers, the idle/inactive measurement capabilities as structured based on RAT instead of CA or DC.

Capabilities defined in NR for measurements are enhanced to indicate the UE's capability to perform IDLE/INACTIVE mode measurements. This (These) capability (ies) could include:

1) whether the UE supports IDLE/INACTIVE mode measurements (i.e. one capability for indicating support for both NR and LTE measurements);

2) separate capabilities for NR (CA and/or NR-DC) measurements and LTE (DC) measurements;

3) a separate validity area support for LTE case (e.g. eutra-IdleMode Validity Area);

4) a separate measurement configuration support for IDLE and INACTIVE mode (e.g. nr-InactiveModeMeasurement, dc-InactiveModeMeasurement, ca-InactiveModeValidityArea, dc-InactiveModeValidityArea, etc.);

5) whether the NR related idle measurements (i.e. for CA and/or; NR-DC measurements) could be cell level only or both cell and beam level; and 6) even further capability differentiation where the differentiation could be also on more detailed aspects such as the number of frequency layers/cells that the UE can support to measure during IDLE or INACTIVE mode, etc.

Since the idle/inactive mode measurements are not defined yet for NR, provided here in the table below are example realizations where the MeasAndMobParameters IE is extended to include capabilities for idle/inactive measurements in both LTE and NR.

```
MeasAndMobParameters : := SEQUENCE {
    measAndMobParametersCommon          MeasAndMobParametersCommon   OPTIONAL,
    measAndMobParametersXDD-Diff        MeasAndMobParametersXDD-Diff      OPTIONAL,
    measAndMobParametersFRX-Diff        MeasAndMobParametersFRX-Diff      OPTIONAL
}
Example 1: not differntiating IDLE and INACTIVE measurements:
MeasAndMobParametersCommon : :=       SEQUENCE {
    supportedGapPattern      BIT STRING (SIZE (22)) OPTIONAL,
    ssb-RLM         ENUMERATED {supported} OPTIONAL,
    ssb-AndCSI-RS-RLM     ENUMERATED {supported} OPTIONAL,
    . . .
    [ [
    eventB-MeasAndReport    ENUMERATED {supported} OPTIONAL,
    handoverFDD-TDD   ENUMERATED {supported} OPTIONAL,
    eutra-CGI-Reporting                 ENUMERATED {supported} OPTIONAL,
    nr-CGI-Reporting                    ENUMERATED {supported} OPTIONAL
    ] ],
    [ [
    independentGapConfig                ENUMERATED {supported} OPTIONAL,
    periodicEUTRA-MeasAndReport   ENUMERATED {supported} OPTIONAL,
    handoverFR1-FR2                     ENUMERATED {supported} OPTIONAL,
    maxNumberCSI-RS-RN-RS-SINR   ENUMERATED {n4, n8, n16, n32, n64, n96}
OPTIONAL
    ] ],
    nr-IdleModeMeasurements-r16             ENUMERATED {supported} OPTIONAL,
    nr-IdleModeValidityArea-r16             ENUMERATED {supported} OPTIONAL,
    eutra-IdleModeMeasurements-r16          ENUMERATED {supported} OPTIONAL,
    eutra-IdleModeValidityArea-r16          ENUMERATED {supported} OPTIONAL,
}
Example 2: differntiating IDLE and INACTIVE measurements:
MeasAndMobParametersCommon : :=                 SEQUENCE {
    supportedGapPattern                         BIT STRING (SIZE (22)) OPTIONAL,
    ssb-RLM                                     ENUMERATED {supported} OPTIONAL,
    ssb-AndCSI-RS-RLM                           ENUMERATED {supported} OPTIONAL,
    . . . ,
    [ [
    eventB-MeasAndReport            ENUMERATED {supported} OPTIONAL,
    handoverFDD-TDD                 ENUMERATED {supported} OPTIONAL,
    eutra-CGI-Reporting             ENUMERATED {supported} OPTIONAL,
    nr-CGI-Reporting                ENUMERATED {supported} OPTIONAL
    ] ],
    [ [
    independentGapConfig            ENUMERATED {supported} OPTIONAL,
    periodicEUTRA-MeasAndReport     ENUMERATED {supported} OPTIONAL,
    handoverFR1-FR2                 ENUMERATED {supported} OPTIONAL,
    maxNumberCSI-RS-RN-RS-SINR   ENUMERATED {n4, n8, n16, n32, n64, n96}
OPTIONAL
    ] ],
    nr-IdleModeMeasurements-r16                 ENUMERATED {supported} OPTIONAL,
    nr-IdleModeValidityArea-r16                 ENUMERATED {supported} OPTIONAL,
    nr-InactiveModeMeasurements-r16             ENUMERATED {supported} OPTIONAL,
    nr-InactiveModeValidityArea-r16             ENUMERATED {supported} OPTIONAL,
    eutra-IdleModeMeasurements-r16              ENUMERATED {supported} OPTIONAL,
    eutra-IdleModeValidityArea-r16              ENUMERATED {supported} OPTIONAL,
    eutra-InactiveModeMeasurements-r16          ENUMERATED {supported} OPTIONAL,
    eutra-InactiveModeValidityArea-r16          ENUMERATED {supported} OPTIONAL
}
```

The above usage of MeasAndMobParameters is an example and there can be other possibilities, including: 1) all capabilities related to IDLE/INACTIVE measurements are included under MeasAndMobParameters; 2) all capabilities related to IDLE/INACTIVE measurements are included under MeasAndMobParametersMRDC; 3) a new capability container IE (e.g. MeasAndMobParameters-IdleInactive) is defined for the sake of idle/inactive measurement capabilities; 4) two new capability container IEs (e.g. MeasAndMobParameters-Idle, MeasAndMobParameters-Inactive) are defined for the sake of idle and inactive measurement capabilities; 5) Etc.

3. Capabilities for Performing NR-DC Measurements in NR IDLE/INACTIVE Modes

In one variant of this embodiment, the idle and/or inactive measurement capability indicators are differentiated between CA and DC (instead of between NR and LTE). For the CA case defined in MeasAndMobParametersCommon according to the embodiment described above could signify capabilities for performing NR measurements for NR-DC case, while in another variant, the capabilities under MeasAndMobParametersMRDC-Common signify the capabilities for performing NR measurements for NR-DC case.

In another variant, the DC related measurement capability is indicated via IEs different from those used for NR measurements for CA purposes and LTE measurements for DC purposes. An example is shown below:

Note that in the above we have differentiated the IDLE and INACTIVE measurement and validity area configurations. It is also possible to have common IEs for IDLE and INACTIVE (e.g. ne-dc-IdleModemeasuremnts-r16, that is used for both inactive and idle modes). It is also possible to have a common measurement config, but separate validity areas for the IDLE and INACTIVE modes, or vice versa (i.e common validity area but separate measurement configs).

Capabilities for Performing Inter-RAT Idle/Inactive Measurements in Different Frequency Range In NR, the carrier frequency bands have been divided into two separate ranges; FR1 and FR2. FR1 is low-band, below 6 GHz while FR2 is high-band, above 6 GHz.

If a UE is camping in one frequency band, it is not certain that the UE can perform idle/inactive measurements in another frequency band.

For instance, if the UE is camping on LTE, it may only measure FR1 in NR or it can measure both FR1 and FR2, or only FR2.

If the UE is camping in NR on FR1, it may be able to measure on LTE, but if the UE is camping on FR2 it cannot measure on LTE. Alternatively if the UE is camping on FR2 it is capable to measure on LTE.

This can be captured e.g. in the capability MeasAndMobParametersFRX-Diff as shown below:

```
MeasAndMobParametersCommon : :=                  SEQUENCE {
    supportedGapPattern                          BIT STRING (SIZE (22)) OPTIONAL,
    ssb-RLM                                      ENUMERATED {supported} OPTIONAL,
    ssb-AndCSI-RS-RLM                            ENUMERATED {supported} OPTIONAL, . . . ,
    [ [
    eventB-MeasAndReport         ENUMERATED {supported} OPTIONAL,
    handoverFDD-TDD              ENUMERATED {supported} OPTIONAL,
    eutra-CGI-Reporting         ENUMERATED {supported} OPTIONAL,
    nr-CGI-Reporting            ENUMERATED {supported} OPTIONAL
    ] ],
    [ [
    independentGapConfig        ENUMERATED {supported} OPTIONAL,
    periodicEUTRA-MeasAndReport ENUMERATED {supported} OPTIONAL,
    handoverFR1-FR2             ENUMERATED {supported} OPTIONAL,
    maxNumberCSI-RS-RN-RS-SINR  ENUMERATED {n4, n8, n16, n32, n64, n96}
OPTIONAL
    ] ],
    ca-IdleModeMeasurements-r16             ENUMERATED {supported} OPTIONAL,
    ca-IdleModeValidityArea-r16             ENUMERATED {supported} OPTIONAL,
    ca-InactiveModeMeasurements-r16         ENUMERATED {supported} OPTIONAL,
    ca-InactiveModeValidityArea-r16         ENUMERATED {supported} OPTIONAL,
    dc-IdleModeMeasurements-r16             ENUMERATED {supported} OPTIONAL,
    dc-IdleModeValidityArea-r16             ENUMERATED {supported} OPTIONAL,
    dc-InactiveModeMeasurements-r16         ENUMERATED {supported} OPTIONAL,
    dc-InactiveModeValidityArea-r16         ENUMERATED {supported} OPTIONAL,
}
MeasAndMobParametersMRDC-v16xx : :=             SEQUENCE {
    measAndMobParametersMRDC-Common-r16            MeasAndMobParametersMRDC-
Common-r16 OPTIONAL,
    measAndMobParametersMRDC-XDD-Diff          MeasAndMobParametersMRDC-XDD-Diff
OPTIONAL,
    measAndMobParametersMRDC-FRX-Diff          MeasAndMobParametersMRDC-FRX-Diff
OPTIONAL
}
MeasAndMobParametersMRDC-Common-r16 : :=         SEQUENCE {
    independentGapConfig                       ENUMERATED {supported} OPTIONAL,
    ne-dc-IdleModeMeasurements-r16          ENUMERATED {supported} OPTIONAL,
    ne-dc-IdleModeValidityArea-r16          ENUMERATED {supported} OPTIONAL,
    ne-dc-InactiveModeMeasurements-r16      ENUMERATED {supported} OPTIONAL,
    ne-dc-InactiveModeValidityArea-r16      ENUMERATED {supported} OPTIONAL,
}
```

```
MeasAndMobParametersFRX-Diff : :=              SEQUENCE {
  ss-SINR-Meas                                 ENUMERATED {supported} OPTIONAL,
  csi-RSRP-AndRSRQ-MeasWithSSB                 ENUMERATED {supported} OPTIONAL,
  csi-RSRP-AndRSRQ-MeasWithoutSSB              ENUMERATED {supported} OPTIONAL,
  csi-SINR-Meas                                ENUMERATED {supported} OPTIONAL,
  csi-RS-RLM                                   ENUMERATED {supported} OPTIONAL,
  . . .
  [ [
  handoverInterF               ENUMERATED {supported} OPTIONAL,
  handoverLTE                  ENUMERATED {supported} OPTIONAL,
  handover-eLTE                ENUMERATED {supported} OPTIONAL
  ] ],
  [ [
  maxNumberResource-CSI-RS-RLM    ENUMERATED {n2, n4, n6, n8} OPTIONAL
  ] ],
  [ [
  simultaneousRxDataSSB-DiffNumerology       ENUMERATED {supported} OPTIONAL
  ] ],
  [ [
  fr1-EUTRA-IdleModeMeasurements-r16     ENUMERATED {supported} OPTIONAL,
  fr1-EUTRA-IdleModeValidityArea-r16     ENUMERATED {supported} OPTIONAL,
  fr2-EUTRA-IdleModeMeasurements-r16     ENUMERATED {supported} OPTIONAL,
  fr2-EUTRA-IdleModeValidityArea-r16     ENUMERATED {supported} OPTIONAL,
  fr1-FR2-NR-IdleModeMeasurements-r16     ENUMERATED {supported} OPTIONAL,
  fr1-FR2-NR-IdleModeValidityArea-r16     ENUMERATED {supported} OPTIONAL,
  fr2-FR1-NR-IdleModeMeasurements-r16     ENUMERATED {supported} OPTIONAL,
  fr2-FR1-NR-IdleModeValidityArea-r16     ENUMERATED {supported} OPTIONAL
  ] ]
}
```

Where fr1-EUTRA-IdleModeMeasurements/fr1-EU-TRA-IdleMode Validity Area and fr2-EUTRA-IdleMode-Measurements/fr2-EUTRA-IdleMode Validity Area indicate support for performing idle/inactive measurements (and configure validity area) in LTE while camping on FR1 and FR2 respectively.

The fr1-FR2-NR-IdleModeMeasurements and fr2-FR1-NR-IdleModeMeasurements indicate support to perform idle/inactive measurements in one frequency range in NR, while camping in another frequency range (i.e. camping in FR1 and measure in FR2 or vice versa).

Similarly in LTE, the capabilities can be introduced as:

INACTIVE modes, or vice versa (i.e. common validity area but separate measurement configs).

Figure 7:
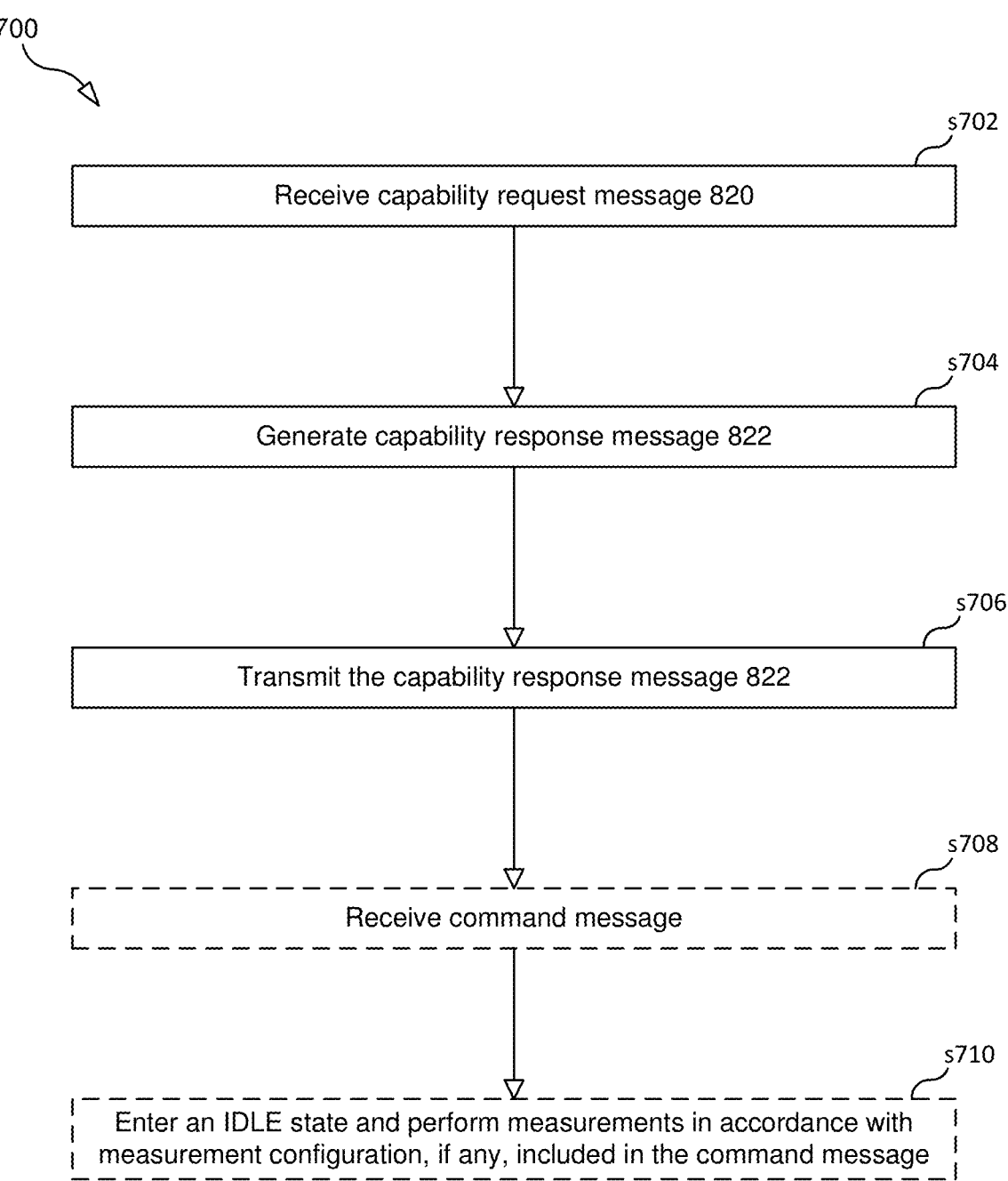
FIG. 7 is a flow chart illustrating a process according to an embodiment.

FIG. 7 is a flowchart illustrating a process 700 according to an embodiment. Process 700 may comprise any combination of one or more of the illustrated steps. In one embodiment, process 700 may begin with step s702.

Figure 8:
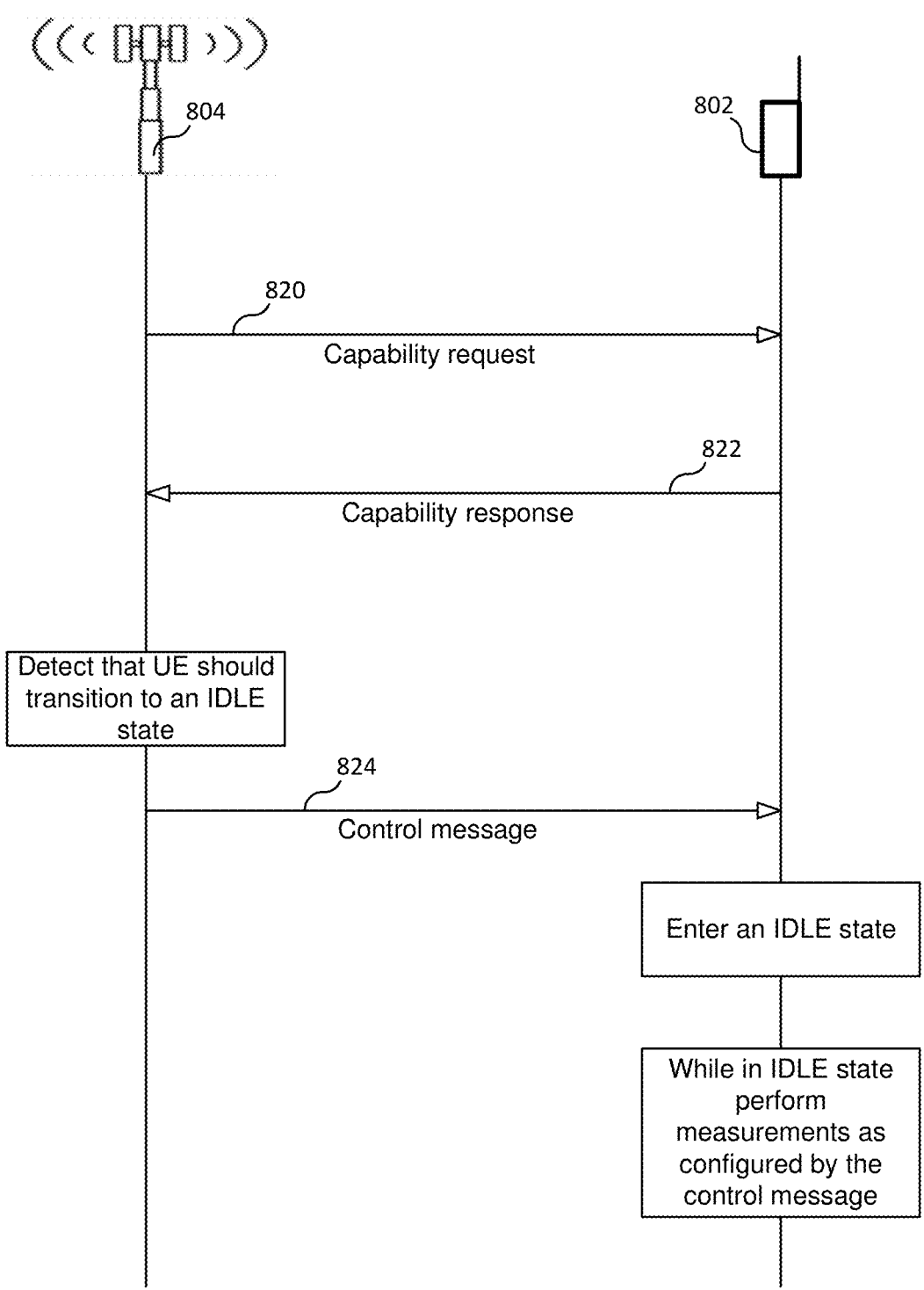
FIG. 8 is a message flow diagram illustrating a message flow according to an embodiment.

Step s702 comprises a UE 802 (see FIG. 8) receiving a capability request message 820 transmitted by a network node 804 of a radio access network (RAN) (e.g., the network node 804 is an eNB or gNB and the capability request message is a UECapabilityEnquiry message).

```
MeasParameters-v1530 : :=              SEQUENCE {
  qoe-MeasReport-r15                   ENUMERATED {supported} OPTIONAL,
  qoe-MTSI-MeasReport-r15              ENUMERATED {supported} OPTIONAL,
  ca-IdleModeMeasurements-r15          ENUMERATED {supported} OPTIONAL,
  ca-IdleModeValidityArea-r15          ENUMERATED {supported} OPTIONAL,
  heightMeas-r15                       ENUMERATED {supported} OPTIONAL,
  multipleCellsMeasExtension-r15       ENUMERATED {supported} OPTIONAL
}
MeasParameters-v16xx : :=              SEQUENCE {
  nr-FR1-IdleModeMeasurements-r16        ENUMERATED {supported} OPTIONAL,
  nr-FR1-IdleModeValidityArea-r16        ENUMERATED {supported} OPTIONAL,
  nr-FR1-InactiveModeMeasurements-r16    ENUMERATED {supported} OPTIONAL,
  nr-FR1-InactiveModeValidityArea-r16    ENUMERATED {supported} OPTIONAL,
  nr-FR2-IdleModeMeasurements-r16        ENUMERATED {supported} OPTIONAL,
  nr-FR2-IdleModeValidityArea-r16        ENUMERATED {supported} OPTIONAL,
  nr-FR2-InactiveModeMeasurements-r16    ENUMERATED {supported} OPTIONAL,
  nr-FR2-InactiveModeValidityArea-r16     ENUMERATED {supported} OPTIONAL,
}
```

Where nr-FR1-IdleModeMeasurements and nr-FR2-Idle-ModeMeasurements indicate support to perform idle measurements in NR on FR1 and FR2 respectively while camping in LTE. Similarly, for the validity area and separate capabilities for the inactive measurements.

Note that in the above we have differentiated the IDLE and INACTIVE measurement and validity area configurations. It is also possible to have common IEs for IDLE and INACTIVE. It is also possible to have a common measurement config, but separate validity areas for the IDLE and Step s704 comprises UE 802, in response to receiving the capability request message, generating a capability response message that indicates whether the UE supports a certain type of measurement. For example, in an embodiment, where the RAN is of a first radio access technology (RAT) type (e.g., an LTE RAN), the capability response message may indicate that the UE has the capability to measure signals transmitted by a network node of a RAN of a second RAT type (e.g., an NR RAN) while the UE is in an idle mode or an inactive mode. For instance, when the RAN is an LTE RAN, the capability response message may indicate that the UE supports NR measurements when the UE is in an IDLE mode or an IDLE with suspended or INACTIVE mode. As another example, when the RAN is an NR RAN (i.e. node 804 is a gNB), the capability response message may indicate that the UE supports LTE measurements during IDE or INACTIVE modes. As yet another example, when the RAN is an NR RAN (i.e. node 804 is a gNB), the capability response message may indicate that the UE supports NR measurements for dual-connectivity (DC) purposes during IDLE or INACTIVE modes. As another example, if the first RAT is LTE, the capability response message indicates whether the UE supports NR measurements in FR1 or FR2; and/or if the first RAT is NR, the capability response message indicates whether the UE supports LTE measurements only if the UE is camping on FR1, and/or if the UE is camping on FR2, the UE doesn't indicate the LTE measurement capability.

Step s706 comprises the UE transmitting the capability response message 822 to the network node 804.

In some embodiments process 700 also includes UE 802 receiving (step s708) a control message 824 (e.g., RRCConnectionRelease) transmitted by network node 804, wherein the control message includes a dedicated measurement configuration for configuring the UE to perform measurements while in an IDLE state. Process 700 may further include step s710 in which UE 802 enters the IDLE state in response to receiving the control message, and, while in the IDLE state, the UE performs a measurement in accordance with the dedicated measurement configuration.

Figure 9:
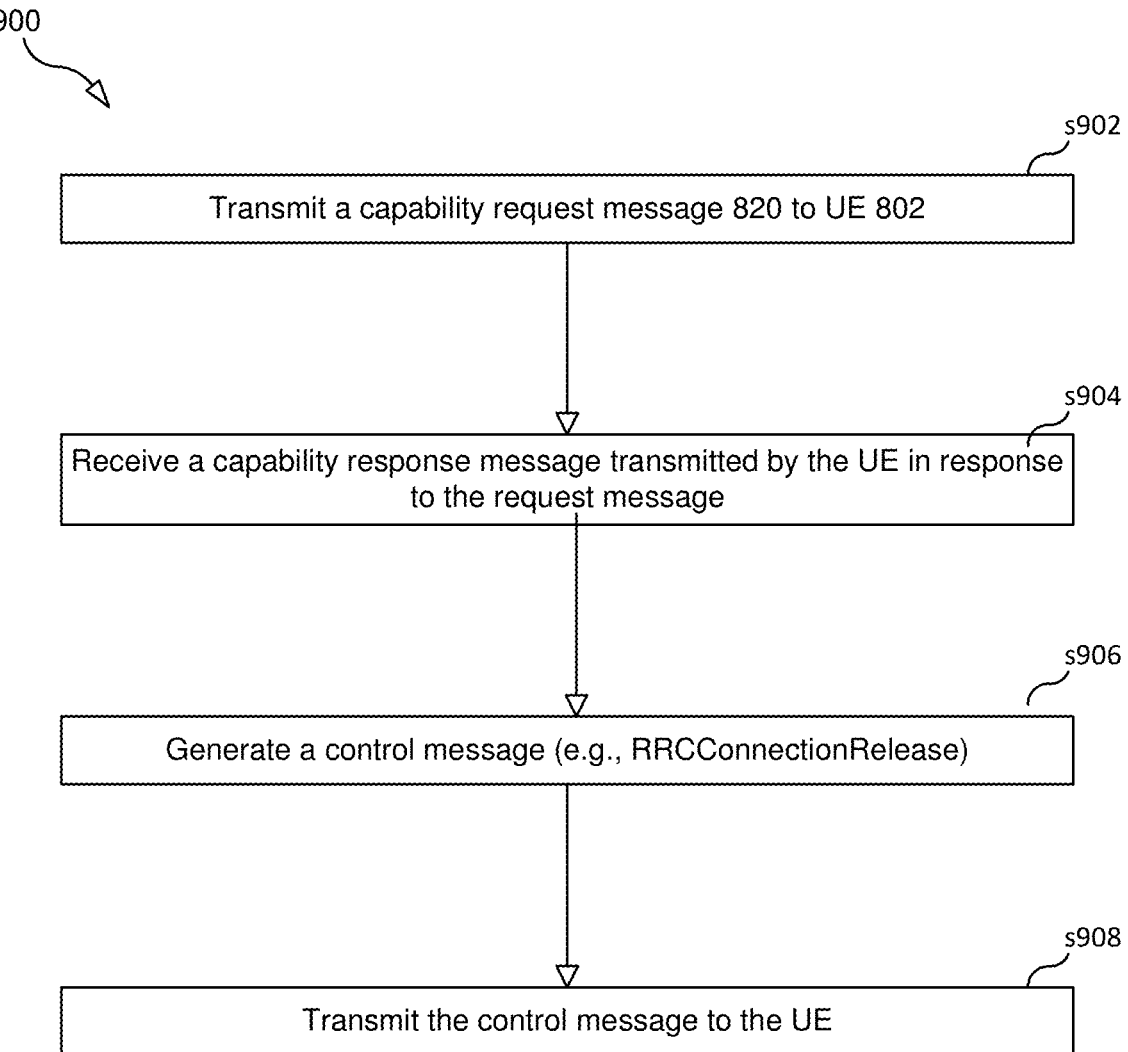
FIG. 9 is a flow chart illustrating a process according to an embodiment.

FIG. 9 is a flowchart illustrating a process 900 according to an embodiment. Process 900 may comprise any combination of one or more of the illustrated steps. In one embodiment, process 900 may begin with step s902.

Figure 10:
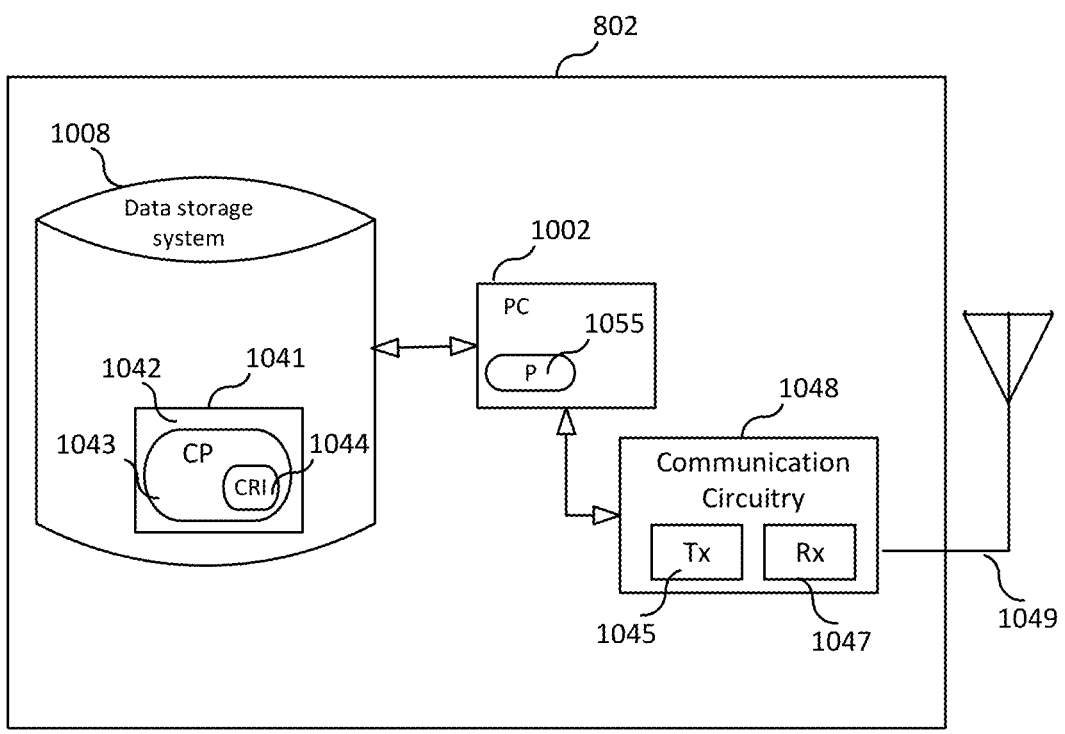
FIG. 10 is a block diagram illustrating a UE according to an embodiment.

Step s902 comprises network node 804 transmitting to UE 802 the capability request message 820 (see FIG. 10).

Step s904 comprises network node 804 receiving the capability response message 822 transmitted by UE 802.

Step s906 comprises network node 804 generating a control message (e.g., RRCConnectionRelease) for causing UE 802 to enter an IDLE mode, wherein the step of generating the control message comprises network node 804 determining, based on information conveyed by the capability response message, whether to include certain measurement configuration information in the control message.

Step s908 comprises network node 804 transmitting the control message to UE 802.

In some embodiments the control message 824 is an RRCConnectionRelease message that includes a dedicated measurement configuration. In some embodiments, the UE is configured to enter an IDLE state in response to receiving the control message, and, while in the IDLE state, perform measurements in accordance with the dedicated measurement configuration.

In some embodiments the first RAT is LTE and the capability response message 822 comprises a UE-EUTRA-Capability information element (IE) that contains information indicating that the UE supports the certain type of measurement. In some embodiments, the UE-EUTRA-Capability IE contains a measurement parameters IE and the measurement parameters IE contains the information indicating that the UE supports the certain type of measurement.

In some embodiments the first RAT is NR and the capability response message 822 comprises an information element (IE) that indicates capabilities related to measurements for radio resource management (RRM), radio link monitoring (RLM) and mobility (e.g. handover), and the IE contains information indicating that the UE supports the certain type of measurement.

FIG. 10 is a block diagram of UE 802, according to some embodiments. As shown in FIG. 10, UE 802 may comprise: processing circuitry (PC) 1002, which may include one or more processors (P) 1055 (e.g., one or more general purpose microprocessors and/or one or more other processors, such as an application specific integrated circuit (ASIC), field-programmable gate arrays (FPGAs), and the like); communication circuitry 1048, which is coupled to an antenna arrangement 1049 comprising one or more antennas and which comprises a transmitter (Tx) 1045 and a receiver (Rx) 1047 for enabling UE 802 to transmit data and receive data (e.g., wirelessly transmit/receive data); and a local storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes UE 802 to perform steps described herein (e.g., steps described herein with reference to the flow charts). In other embodiments, UE 802 may be configured to perform steps described herein without the need for code. That is, for example, PC 1002 may consist merely of one or more ASICs. Hence, the features of the embodiments described herein may be implemented in hardware and/or software.

Figure 11:
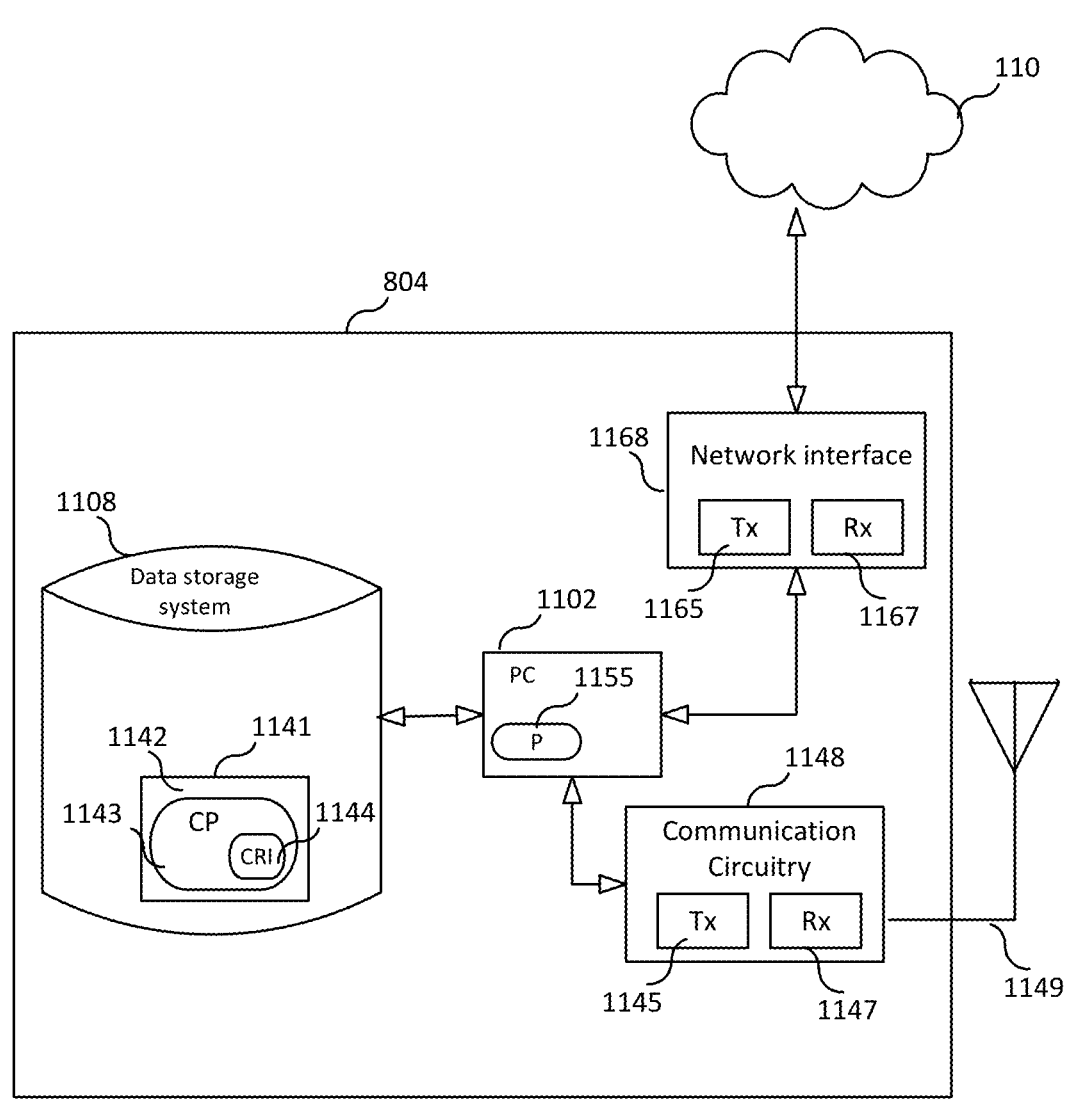
FIG. 11 is a block diagram illustrating a RAN network node according to an embodiment.

FIG. 11 is a block diagram of network node 804, according to some embodiments. As shown in FIG. 11, the network node may comprise: processing circuitry (PC) 1102, which may include one or more processors (P) 1155 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., network node 804 may be a distributed computing apparatus); a network interface 1168 comprising a transmitter (Tx) 1165 and a receiver (Rx) 1167 for enabling network node 804 to transmit data to and receive data from other nodes connected to a network 110 (e.g., an Internet Protocol (IP) network) to which network interface 1148 is connected; communication circuitry 1148, which is coupled to an antenna arrangement 1149 comprising one or more antennas and which comprises a transmitter (Tx) 1145 and a receiver (Rx) 1147 for enabling the network node 804 to transmit data and receive data (e.g., wirelessly transmit/receive data); and a local storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes the network node 804 to perform steps described herein (e.g., steps described herein with reference to the flow charts). In other embodiments, the network node 804 may be configured to perform steps described herein without the need for code. That is, for example, PC 1102 may consist merely of one or more ASICs. Hence, the features of the embodiments described herein may be implemented in hardware and/or software.

Figure 12:
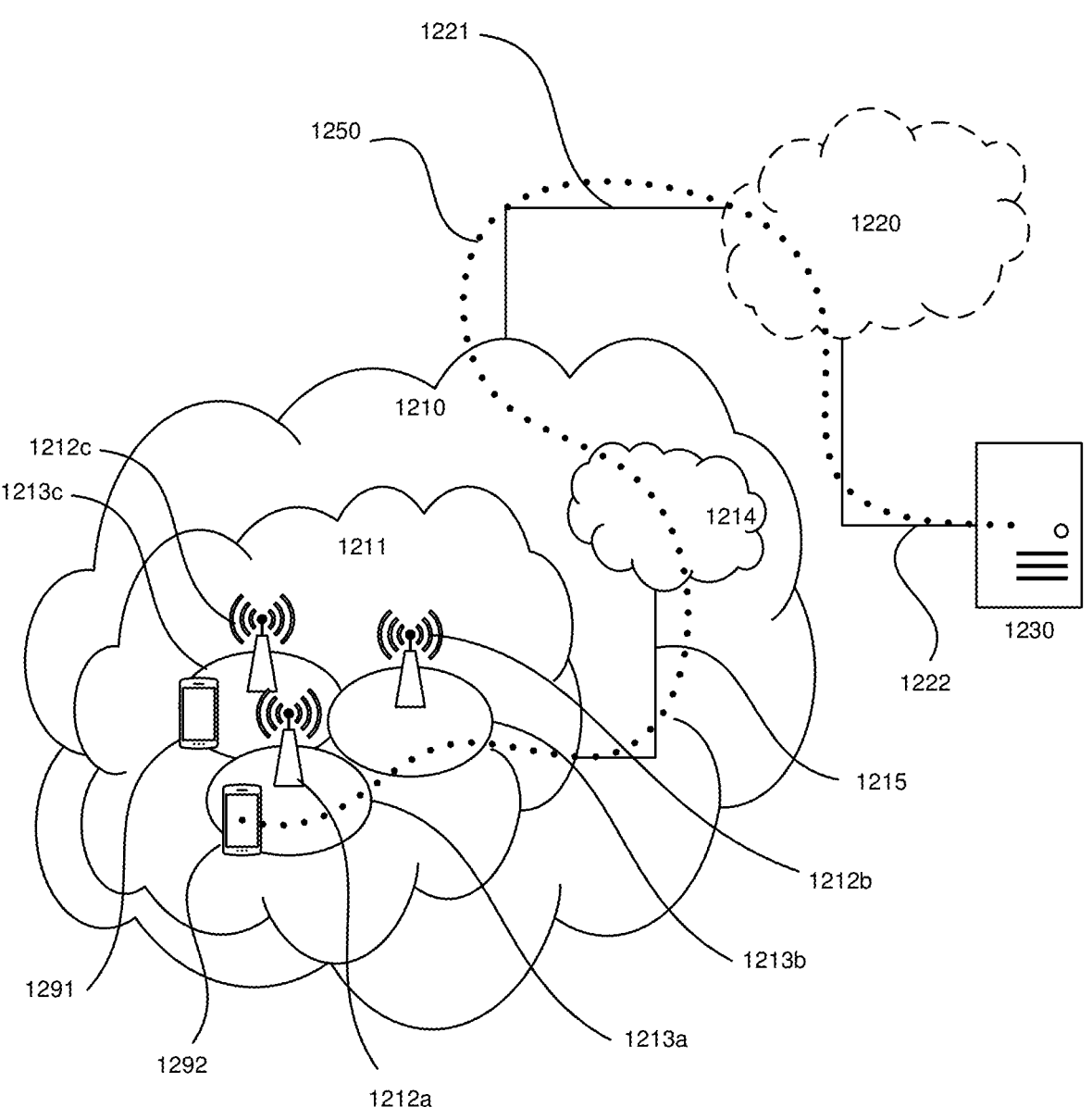
FIG. 12 schematically illustrates a telecommunication network connected via an intermediate network to a host computer.

FIG. 12 illustrates a telecommunication network connected via an intermediate network to a host computer in accordance with some embodiments. With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of APs (hereafter base stations) 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13, which illustrates a host computer communicating via a base station with a user equipment over a partially wireless connection in accordance with some embodiments. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 13:
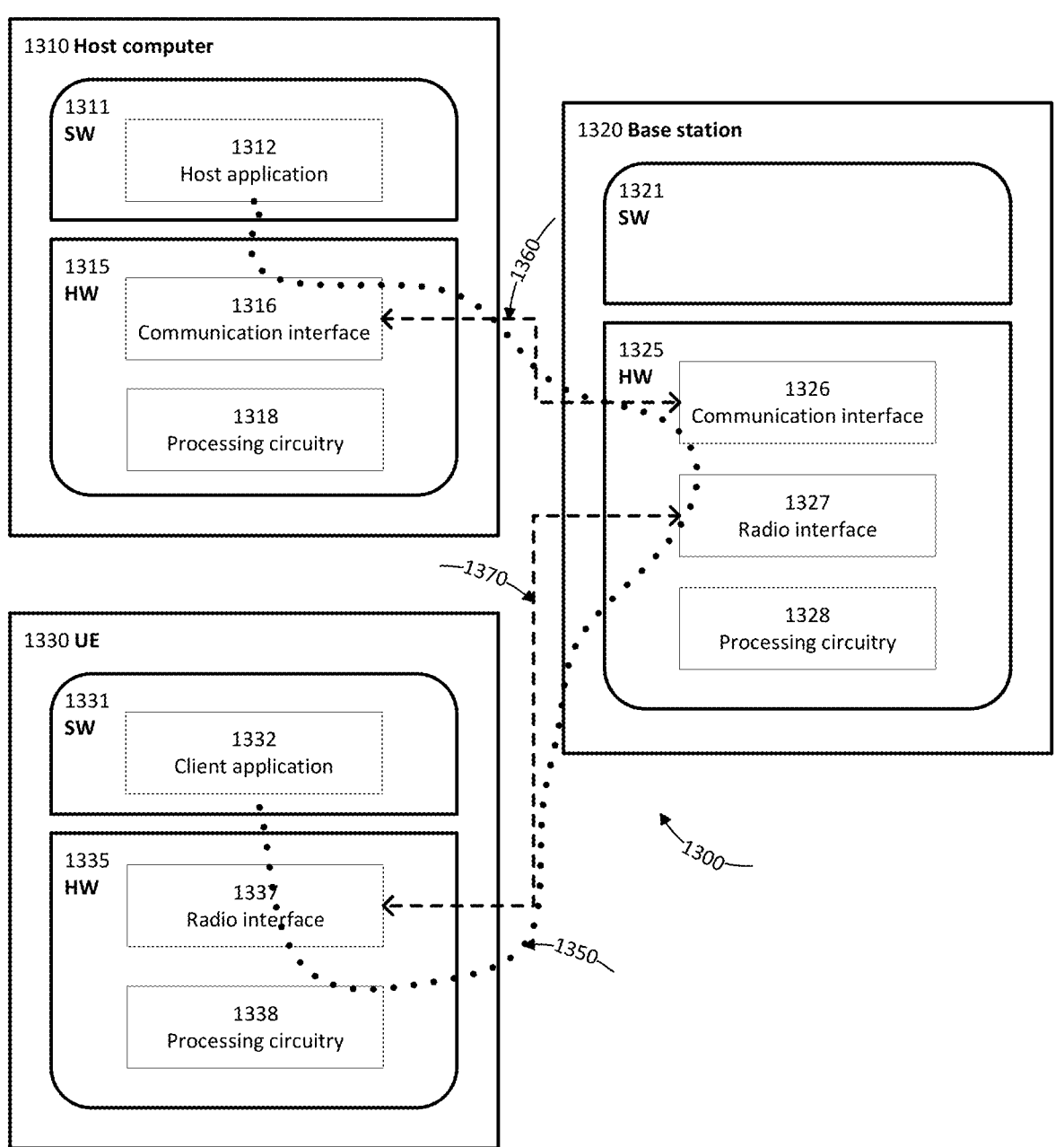
FIG. 13 is a generalized block diagram of a host computer communicating via a base station with a user equipment over a partially wireless connection.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve one or more of the data rate, latency, block error ratio (BLER), overhead, and power consumption and thereby provide benefits such as reduced user waiting time, better responsiveness, extended battery lifetime, etc..

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
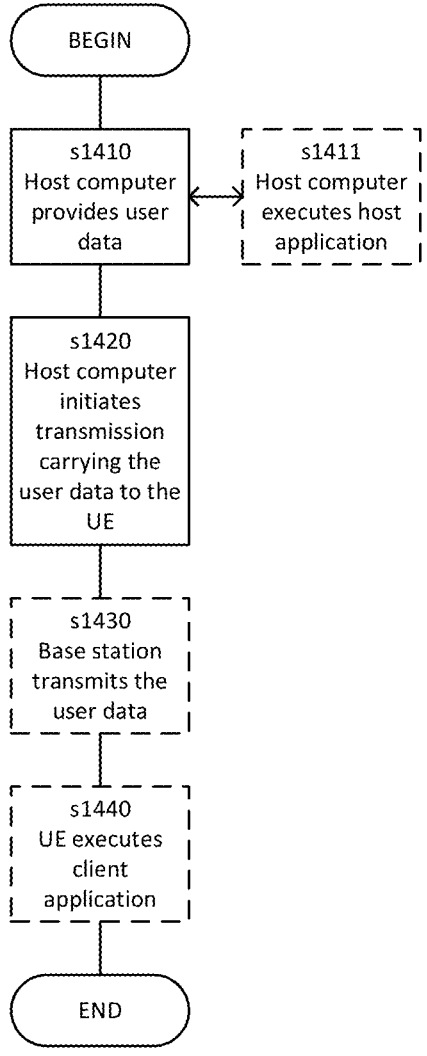
FIG. 14 is a flowchart illustrating a method implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIG. 12 and FIG. 13. In step S1410, the host computer provides user data. In substep S1411 (which may be optional) of step S1410, the host computer provides the user data by executing a host application. In step S1420, the host computer initiates a transmission carrying the user data to the UE. In step S1430 (which may be optional), the base station transmits to the UE the user data which was carried in the transmission that the host computer initiated, in accordance with the teachings of the embodiments described throughout this disclosure. In step S1440 (which may also be optional), the UE executes a client application associated with the host application executed by the host computer.

Figure 15:
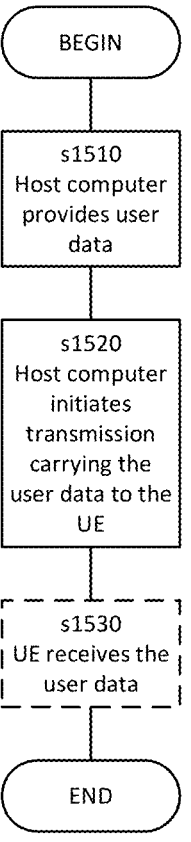
FIG. 15 is a flowchart illustrating a method implemented in a communication system including a host computer, a base station and a user equipment.

FIG. 15 is a flowchart illustrating a method implemented in a communication system, in accordance with one embodiment. The communication system includes a host computer, a base station and a UE which may be those described with reference to FIG. 12 and FIG. 13. For simplicity of the present disclosure, only drawing references to FIG. 15 will be included in this section. In step S1510 of the method, the host computer provides user data. In an optional substep (not shown) the host computer provides the user data by executing a host application. In step S1520, the host computer initiates a transmission carrying the user data to the UE. The transmission may pass via the base station, in accordance with the teachings of the embodiments described throughout this disclosure. In step S1530 (which may be optional), the UE receives the user data carried in the transmission.

Figure 16:
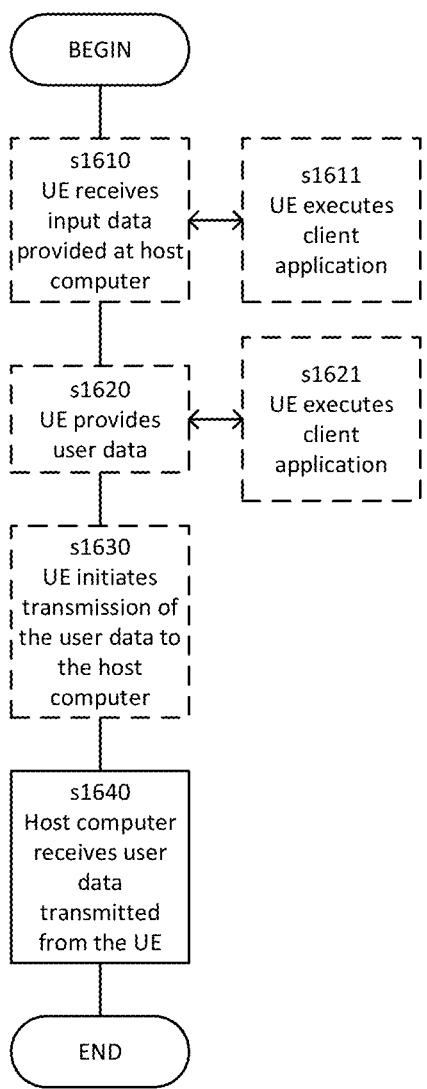
FIG. 16 is a flowchart illustrating a method implemented in a communication system including a host computer, a base station and a user equipment.

FIG. 16 is a flowchart illustrating a method implemented in a communication system, in accordance with one embodiment. The communication system includes a host computer, a base station and a UE which may be those described with reference to FIG. 12 and FIG. 13. For simplicity of the present disclosure, only drawing references to FIG. 16 will be included in this section. In step S1610 (which may be optional), the UE receives input data provided by the host computer. Additionally or alternatively, in step S1620, the UE provides user data. In substep S1621 (which may be optional) of step S1620, the UE provides the user data by executing a client application. In substep S1611 (which may be optional) of step S1610, the UE executes a client application which provides the user data in reaction to the received input data provided by the host computer. In providing the user data, the executed client application may further consider user input received from the user. Regardless of the specific manner in which the user data was provided, the UE initiates, in substep S1630 (which may be optional), transmission of the user data to the host computer. In step S1640 of the method, the host computer receives the user data transmitted from the UE, in accordance with the teachings of the embodiments described throughout this disclosure.

Figure 17:
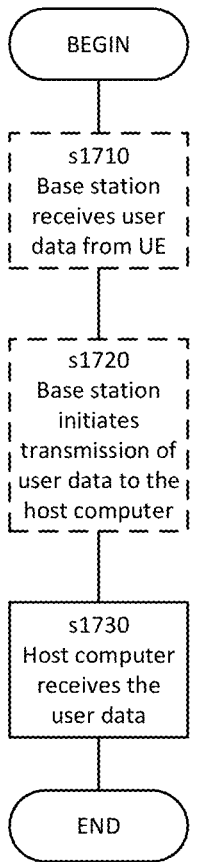
FIG. 17 is a flowchart illustrating a method implemented in a communication system including a host computer, a base station and a user equipment.

FIG. 17 is a flowchart illustrating a method implemented in a communication system, in accordance with one embodiment. The communication system includes a host computer, a base station and a UE which may be those described with reference to FIG. 12 and FIG. 13. For simplicity of the present disclosure, only drawing references to FIG. 17 will be included in this section. In step S1710 (which may be optional), in accordance with the teachings of the embodiments described throughout this disclosure, the base station receives user data from the UE. In step S1720 (which may be optional), the base station initiates transmission of the received user data to the host computer. In step S1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

Summary of Various Embodiments

A1. A method performed by a UE (802), the method comprising one or more of: receiving (s702) a capability request message (820) transmitted by a network node (804) of a RAN implementing a first RAT (e.g. LTE or NR); in response to receiving the capability request message, generating (s704) a capability response message (822) that indicates whether the UE supports a certain type of measurement; and transmitting (s706) the capability response message 822 to the network node 804, wherein if the first RAT is LTE, then the capability response message indicates whether the UE supports NR measurements when the UE is in an IDLE mode or IDLE with suspended or INACTIVE mode, and/or wherein if the first RAT is NR, then the capability response message indicates whether the UE supports LTE measurements when the UE is in an IDLE or INACTIVE mode; and/or wherein if the first RAT is LTE, the capability response message indicates whether the UE supports NR measurements in FR1 or FR2; and/or wherein if the first RAT is NR, the capability response message indicates whether the UE supports LTE measurements only if the UE is camping on FR1, and/or if the UE is camping on FR2, the UE doesn't indicate the LTE measurement capability.

A2. The method of embodiment A1, further comprising receiving (s708) a control message (e.g., RRCConnectionRelease) transmitted by the network node, wherein the control message includes a dedicated measurement configuration.

A3. The method of embodiment A2, further comprising entering an IDLE state in response to receiving the control message; and/or while in the IDLE state, performing a measurement in accordance with the dedicated measurement configuration.

A4. The method of any one of embodiments A1 to A3, wherein the first RAT is LTE and the capability response message comprises a UE-EUTRA-Capability information element (IE) that contains information indicating that the UE supports the certain type of measurement.

A5. The method of embodiment A4, wherein the UE-EUTRA-Capability IE contains a measurement parameters IE and the measurement parameters IE contains the information indicating that the UE supports the certain type of measurement.

A6. The method of any one of embodiments A1 to A3, wherein the first RAT is NR and the capability response message comprises an information element (IE) that indicates capabilities related to measurements for radio resource management (RRM), radio link monitoring (RLM) and mobility (e.g. handover), and the IE contains information indicating that the UE supports the certain type of measurement.

B1. A method performed by a network node (804) operating in accordance with a first radio access technology, RAT (e.g., NR, LTE, etc.), the method comprising one or more of: transmitting (s902) a capability request message (820) to a UE (802); receiving (s904) a capability response message (822) transmitted by the UE in response to the request message, wherein the response message (822) indicates whether the UE supports a certain type of measurement; generating (s906) a control message (824) (e.g., RRCConnectionRelease) for causing the UE to enter an IDLE mode, wherein the step of generating the control message comprises the network node determining, based on information conveyed by the capability response message, whether to include certain measurement configuration information in the control message; and/or transmitting (s908) the control message to the UE (802), wherein if the first RAT is LTE, then the capability response message indicates whether the UE supports NR measurements when the UE is in an IDLE mode or IDLE with suspended or INACTIVE mode, and/or wherein if the first RAT is NR, then the capability response message indicates whether the UE supports LTE measurements when the UE is in an IDLE or INACTIVE mode; and/or wherein if the first RAT is LTE, the capability response message indicates whether the UE supports NR measurements in FR1 or FR2; and/or wherein if the first RAT is NR, the capability response message indicates whether the UE supports LTE measurements only if the UE is camping on FR1, if the UE is camping on FR2, the UE doesn't indicate the LTE measurement capability.

B2. The method of embodiment B1, wherein the control message is an RRCConnectionRelease message that includes a dedicated measurement configuration.

B3. The method of embodiment B2, wherein the UE is configured to enter an IDLE state in response to receiving the control message, and, while in the IDLE state, perform measurements in accordance with the dedicated measurement configuration.

B4. The method of any one of embodiments B1 to B3, wherein the first RAT is LTE and the capability response message comprises a UE-EUTRA-Capability information element (IE) that contains information indicating that the UE supports the certain type of measurement.

B5. The method of embodiment B4, wherein the UE-EUTRA-Capability IE contains a measurement parameters IE and the measurement parameters IE contains the information indicating that the UE supports the certain type of measurement.

B6. The method of any one of embodiments B1 to B3, wherein the first RAT is NR and the capability response message comprises an information element (IE) that indicates capabilities related to measurements for radio resource management (RRM), radio link monitoring (RLM) and mobility (e.g. handover), and the IE contains information indicating that the UE supports the certain type of measurement.

C1. A computer program comprising instructions which when executed by processing circuitry of a user equipment (802) causes the user equipment to perform the method of any one of the above embodiments A1 to A3.

D1. A computer program comprising instructions which when executed by processing circuitry of a network node (804) causes the network node to perform the method of any one of the above embodiments B1 to B3.

E1. A carrier containing the computer program of claim C1 or D1, wherein the carrier is one of an electronic signal, an optical signal, a radio signal, and a computer readable storage medium.

F1. A UE (802), the UE being adapted to: in response to receiving a capability request message transmitted by a network node (804) of a RAN implementing a first RAT (e.g. LTE or NR), generating (s704) a capability response message (822) that indicates whether the UE supports a certain type of measurement; and transmitting (s706) the capability response message 822 to the network node 804, wherein if the first RAT is LTE, then the capability response message indicates whether the UE supports NR measurements when the UE is in an IDLE mode or IDLE with suspended or INACTIVE mode, and/or wherein if the first RAT is NR, then the capability response message indicates whether the UE supports LTE measurements when the UE is in an IDLE or INACTIVE mode; and/or wherein if the first RAT is LTE, the capability response message indicates whether the UE supports NR measurements in FR1 or FR2; and/or wherein if the first RAT is NR, the capability response message indicates whether the UE supports LTE measurements only if the UE is camping on FR1, and/or if the UE is camping on FR2, the UE doesn't indicate the LTE measurement capability.

G1. A network node (804) operable to operate in accordance with a first radio access technology, RAT (e.g., NR, LTE, etc.), the network node being adapted to: transmit (s902) a capability request message (820) to a UE (802); receive (s904) a capability response message (822) transmitted by the UE in response to the request message, wherein the response message (822) indicates whether the UE supports a certain type of measurement; generate (s906) a control message (824) for causing the UE to enter an IDLE mode, wherein the step of generating the control message comprises the network node determining, based on information conveyed by the capability response message, whether to include certain measurement configuration information in the control message; and transmit (s908) the control message (824) to the UE, wherein if the first RAT is LTE, then the capability response message indicates whether the UE supports NR measurements when the UE is in an IDLE mode or IDLE with suspended or INACTIVE mode, and/or wherein if the first RAT is NR, then the capability response message indicates whether the UE supports LTE measurements when the UE is in an IDLE or INACTIVE mode; and/or wherein if the first RAT is LTE, the capability response message indicates whether the UE supports NR measurements in FR1 or FR2; and/or wherein if the first RAT is NR, the capability response message indicates whether the UE supports LTE measurements only if the UE is camping on FR1, and/or if the UE is camping on FR2, the UE doesn't indicate the LTE measurement capability.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the method comprising:

transmitting, to a network node of a New Radio (NR) radio access network (RAN), a capability message that indicates whether the UE supports Evolved UTMS Terrestrial Access (EUTRA) measurements while the UE is in NR Radio Resource Control (RRC) IDLE or RRC INACTIVE mode.

2. The method of claim 1, wherein the method further comprises the UE receiving a capability request message received from the network node of the NR RAN.

3. The method of claim 2, wherein the UE the capability message is responsive to the capability request message.

4. The method of claim 1, wherein the capability message comprises an information element (IE) comprising information indicating capabilities of the UE related to measurements for radio resource management, radio link monitoring, and/or mobility.

5. A method performed by a network node, the method comprising:

receiving a capability message from a user equipment (UE), wherein the capability message indicates whether the UE supports Evolved UTMS Terrestrial Access (EUTRA) measurements while the UE is in a New Radio (NR) Radio Resource Control (RRC) IDLE mode or an RRC INACTIVE mode; and transmitting, to the UE, a control message for causing the UE to enter either the RRC IDLE mode or the RRC INACTIVE mode, wherein when the received capability message indicates that the UE supports EUTRA measurements while the UE is in RRC IDLE or RRC INACTIVE mode, the control message further includes configuration information for configuring the UE to perform one or more EUTRA measurements while the UE is in the RRC IDLE mode or the RRC INACTIVE mode.

6. The method of claim 5, wherein the capability message is received in response to a capability request message transmitted by the network node to the UE.

7. The method of claim 5, wherein the received capability message comprises an information element (IE) comprising information indicating capabilities of the UE related to measurements for radio resource management, radio link monitoring, and/or mobility.

8. A user equipment (UE), the UE comprising:

processing circuitry; and a memory containing instructions executable by the processing circuitry to perform a method comprising:

transmitting, to a network node of a New Radio (NR) radio access network (RAN), a capability message that indicates whether the UE supports Evolved UTMS Terrestrial Access (EUTRA) measurements while the UE is in NR Radio Resource Control (RRC) IDLE or RRC INACTIVE mode.

9. The UE of claim 8, further comprising a receiver for receiving a capability request message received from the network node of the NR RAN.

10. The UE of claim 9, wherein the UE the capability message is responsive to the capability request message.

11. The UE of claim 8, wherein the capability message comprises an information element (IE) comprising information indicating capabilities of the UE related to measurements for radio resource management, radio link monitoring, and/or mobility.

12. A network node, the network node comprising:

processing circuitry; and a memory containing instructions executable by the processing circuitry to perform a method comprising:

receiving a capability message from a user equipment (UE), wherein the capability message indicates whether the UE supports Evolved UTMS Terrestrial Access (EUTRA) measurements while the UE is in a New Radio (NR) Radio Resource Control (RRC) IDLE mode or an RRC INACTIVE mode; and transmitting, to the UE, a control message for causing the UE to enter either the RRC IDLE mode or the RRC INACTIVE mode, wherein when the received capability message indicates that the UE supports EUTRA measurements while the UE is in RRC IDLE or RRC INACTIVE mode, the control message further includes configuration information for configuring the UE to perform one or more EUTRA measurements while the UE is in the RRC IDLE mode or the RRC INACTIVE mode.

13. The network node of claim 12, further comprising a transmitter, wherein the network node is configured to employ the transmitter to transmit to the UE a capability request message.

14. The network node of claim 13, wherein the capability message is responsive to the capability request message transmitted by the network node to the UE.

15. The network node of claim 12, wherein the received capability message comprises an information element (IE) comprising information indicating capabilities of the UE related to measurements for radio resource management, radio link monitoring, and/or mobility.

\* \* \* \* \*